(12) United States Patent
Fermann et al.

(10) Patent No.: US 8,971,358 B2
(45) Date of Patent: Mar. 3, 2015

(54) BROADBAND GENERATION OF MID IR, COHERENT CONTINUA WITH OPTICAL FIBERS

(75) Inventors: Martin Fermann, Dexter, MI (US); Ingmar Hartl, Hamburg (DE)

(73) Assignee: IMRA America, Inc., Ann Arbor, MI (US)

( * ) Notice: Subject to any disclaimer, the term of this patent is extended or adjusted under 35 U.S.C. 154(b) by 299 days.

(21) Appl. No.: 13/415,374

(22) Filed: Mar. 8, 2012

(65) Prior Publication Data

US 2012/0236314 A1 Sep. 20, 2012

Related U.S. Application Data

(60) Provisional application No. 61/452,346, filed on Mar. 14, 2011.

(51) Int. Cl.
*H01S 3/30* (2006.01)
*H01S 3/098* (2006.01)
*H01S 3/10* (2006.01)
*G02F 1/365* (2006.01)
*G02F 1/35* (2006.01)

(52) U.S. Cl.
CPC ........ *G02F 1/365* (2013.01); *G02F 2001/3528* (2013.01)
USPC ................................... 372/6; 372/18; 372/21

(58) Field of Classification Search
CPC ..... H01S 3/063; H01S 3/067; H01S 3/06741; H01S 3/06754; H01S 3/1106
USPC ...................... 372/6, 18, 19, 21, 25
See application file for complete search history.

(56) References Cited

U.S. PATENT DOCUMENTS

| | | | |
|---|---|---|---|
| 5,515,194 A | 5/1996 | Kanterakis | |
| 6,775,447 B2 | 8/2004 | Nicholson | |
| 7,257,302 B2 | 8/2007 | Fermann | |
| 7,519,253 B2 | 4/2009 | Islam | |
| 7,715,672 B2 | 5/2010 | Dong | |
| 7,782,910 B2 | 8/2010 | Fermann | |
| 7,809,222 B2 | 10/2010 | Hartl | |
| 8,787,410 B2 | 7/2014 | Fermann | |
| 2004/0057682 A1* | 3/2004 | Nicholson et al. | 385/122 |
| 2005/0225841 A1 | 10/2005 | Bragheri | |

(Continued)

OTHER PUBLICATIONS

An International Search Report and A Written Opinion both dated Jun. 27, 2012, which issued during the prosecution of Applicant's PCT/US12/28196.

(Continued)

*Primary Examiner* — Armando Rodriguez
(74) *Attorney, Agent, or Firm* — Sughrue Mion, PLLC; Richard C. Turner

(57) ABSTRACT

Coherent and compact supercontinuum light sources for the mid IR spectral regime are disclosed and exemplary applications thereof. The supercontinuum generation is based on the use of highly nonlinear fibers or waveguides. In at least one embodiment the coherence of the supercontinuum sources is increased using low noise mode locked short pulse sources. Compact supercontinuum light sources can be constructed with the use of passively mode locked fiber or diode lasers. Wavelength tunable sources can be constructed using appropriate optical filters or frequency conversion sections. Highly coherent supercontinuum sources further facilitate coherent detection schemes and can improve the signal/noise ratio in lock in detection schemes.

26 Claims, 10 Drawing Sheets

(56) References Cited

U.S. PATENT DOCUMENTS

| | | |
|---|---|---|
| 2005/0238070 A1 | 10/2005 | Imeshev et al. |
| 2007/0086713 A1 | 4/2007 | Ingmar et al. |
| 2010/0225897 A1 | 9/2010 | Fermann |
| 2011/0019700 A1 | 1/2011 | Jiang |
| 2011/0069375 A1 | 3/2011 | Lin et al. |
| 2012/0162748 A1 | 6/2012 | Fermann |
| 2012/0281720 A1 | 11/2012 | Fermann |

OTHER PUBLICATIONS

Buccoliero et al., "Thulium pumped high power supercontinuum in loss-determined optimum lengths of tellurite photonic crystal fiber", Appl. Phys. Lett. 97, 061106 (2010); doi:10.1063/1.3478835 (3 pages).

F.A. Oguama et al., 'Simultaneous measurement of the Raman gain coefficient and the nonlinear refractive index of optical fibers: theory and experiment', J. Opt. Soc. Am. B, vol. 22, 426 (2005).

Hu et al., 'Maximizing the bandwidth of supercontinuum generation in As2Se3 chalcogenide fibers', Opt. Expr., vol. 18, pp. 6722 (2010).

J.H.V. Price et al., 'Supercontinuum generation and nonlinearity in soft glass fibers', in chapter VI of J.M. Dudley et al., 'Supercontinuum generation in optical fibers', Cambridge University Press (2010).

K. Kieu and M. Mansuripur, 'Femtosecond laser pulse generation with a fiber taper embedded in carbon nanotube/polymer composite', Opt. Lett., 32, 2242-2244 (2007).

M. D. O'Donnell et al., 'Tellurite and Fluorotellurite Glasses for Fiberoptic Raman Amplifiers: Glass Characterization, Optical Properties, Raman Gain, Preliminary Fiberization, and Fiber Characterization', J. Am. Ceram. Soc., vol. 90, pp. 1448 (2007).

M. R. E. Lamont et al., 'Supercontinuum generation in dispersion engineered highly nonlinear (y=10/W/m)As2S3 chalcogenide planar waveguide', Opt. Expr., vol. 19, pp. 14938 (2008).

T. Hori, 'Studies on Ultrawideband Supercontinuum Generation by Use of Ultrashort Pulse and Optical Fibers', Ph.D. Thesis, Nagoya University, Japan (2005).

W. Q. Zhang et al., 'A genetic algorithm based approach to fiber design for high coherence and large bandwidth supercontinuum generation', Opt. Expr., vol. 17, pp. 19311 (2009).

W.C. Swann et al., Fiber-laser frequency combs with subhertz relative bandwidths, Opt. Lett., vol. 31, pp. 3046-3048 (2006).

X. Yan et al., 'Transient Raman response and soliton self-frequency shift in tellurite microstructured fiber', Journal of Applied Physics, vol. 108, pp. 123110 (2010).

Non-Final Office Action, dated May 28, 2014, U.S. Appl. No. 13/458,058 pp. 1-12 (published as 2012-0281720).

* cited by examiner

REFRACTIVE INDEX PROFILE (RIP)

BROADBAND GENERATION OF MID IR, COHERENT CONTINUA WITH OPTICAL FIBERS

This application claims benefit of U.S. Provisional Application No. 61/452,346 filed Mar. 14, 2011. The above-noted application is incorporated herein by reference.

FIELD OF THE INVENTION

The invention relates to compact, high brightness, broadband, mid IR coherent fiber light sources and exemplary applications.

BACKGROUND

High brightness broadband coherent light sources have many applications in medicine, spectroscopy, microscopy, ranging, sensing and metrology. Such sources need to be highly robust, have long term stability, and also comprise a minimal component count with a high degree of optical integration for mass market applications. Broadband light sources based on frequency broadening or supercontinuum generation in highly nonlinear fibers are particularly useful. When used in conjunction with short pulse fiber lasers, an all-fiber system construction is possible for supercontinuum generation which results in benefits such as greatly simplified manufacturing routines, low cost and high levels of thermo-mechanical stability.

Fiber based supercontinuum sources can produce spectral output from the UV to the mid-IR and have attracted a vast amount of research in the last few years, see for example J. M. Dudley et al., 'Supercontinuum generation in optical fibers', Cambridge University Press (2010). To reach the mid-IR, for example the wavelength range from about 2.5-10.0 μm, soft glasses or heavy metal oxide glasses may be implemented for supercontinuum generation, as recently reviewed by J. H. V. Price et al., 'Supercontinuum generation and nonlinearity in soft glass fibers', in chapter VI of J. M. Dudley et al., 'Supercontinuum generation in optical fibers', Cambridge University Press (2010). Such fiber based mid-IR sources operating in the mid-IR can potentially replace more established optical parametric oscillators (OPOs), amplifiers (OPAs) and generators (OPGs) and are therefore of considerable interest.

Highly nonlinear fibers based on silica glass have already reached a relatively high level of maturity. To reduce the pulse energy requirements for supercontinuum generation, highly nonlinear silica fibers with extremely small cores are beneficial. For example, silica based highly nonlinear fibers and in particular photonic crystal fibers were recently described in Dong et al., 'Ultra high numerical aperture optical fibers', U.S. Pat. No. 7,715,672, where the additional use of highly Germania doped central core sections was further suggested to lower the pulse energy requirements for supercontinuum generation. Indeed silica fiber based supercontinuum sources employing short pulse fiber sources were, for example, described in T. Hori, 'Studies on Ultrawideband Supercontinuum Generation by Use of Ultrashort Pulse and Optical Fibers', Ph.D. Thesis, Nagoya University, Japan (2005). These all-fiber supercontinuum sources were operated using short pulse lasers emitting at wavelengths near 1560 nm and used highly nonlinear silica fibers with high levels of Germania concentration inside the core. Such all fiber sources were also shown to produce supercontinua with high levels of coherence and were used in the demonstration of ultra-low noise frequency comb sources in W. C. Swann et al., "Fiber-laser frequency combs with subhertz relative bandwidths", Opt. Lett., vol. 31, pp. 3046-3048 (2006). Low noise frequency comb sources operating with laser sources emitting near 1550 nm can operate at repetition rates in the range from 50-1000 MHz. The upper limit is generally governed by design constraints of the laser sources implemented. The lower limit is governed by mechanical stability considerations.

There still remains a need for low noise supercontinuum sources that can operate at repetition rates >1 GHz, particularly at wavelengths near 1550 nm. There also still remains a need for low noise supercontinuum sources that can operate with short pulse laser sources operating at wavelengths >1700 nm and produce broad coherent spectral coverage extended to the mid IR. Also, there still remains a need for low noise highly coherent supercontinuum sources based on soft glasses or highly nonlinear waveguides.

SUMMARY OF THE INVENTION

Low noise fiber based coherent supercontinuum sources allowing for broad spectral coverage are described. In order to increase the coherence of the supercontinuum, highly nonlinear fibers are implemented in conjunction with a low noise pulse source emitting at wavelengths >1700 nm. Such low noise pulse sources can comprise core pumped mode-locked Tm fiber oscillators amplified in nonlinear core pumped Tm fiber amplifiers. Alternatively, cladding pumped linear Tm fiber amplifiers can also be used with a core pumped mode-locked Tm fiber oscillator. Highly coherent, low noise supercontinuum generation is possible using low noise core pumped Tm fiber laser sources as well as any suitable low noise laser source producing short pulses. Such low noise pulsed laser sources may, for example, be pumped with a single frequency pump laser or a pump laser showing negligible transverse or longitudinal mode structure such as an amplified spontaneous emission source. These short pulse laser sources preferably generate pulse widths <1 ps, more preferably pulse widths <300 fs, and most preferably pulse widths <100 fs. Highly nonlinear silica fibers can be produced by using high levels of Germania doping inside the fiber core. Germania doping levels >10 mole % and more preferably >20 mole % can be implemented. Highly Germania doped, highly nonlinear fibers using step index refractive index profiles, W shaped index profiles or more complex refractive index profiles can be readily implemented. For wavelengths >1700 nm, highly nonlinear germano-silicate fibers can be further designed to be dispersion flattened while providing an all-fiber design.

Germania doped photonic crystal fibers incorporating air-holes surrounding a central core section can also readily be used for coherent supercontinuum generation. Such Germania doped photonic crystal fibers are particularly useful when using laser sources with emission wavelengths >1700 nm, where the amount of dispersion management with conventional step index fibers is somewhat limited.

Alternatively, particularly for coherent supercontinuum generation at wavelengths >2000 nm, low noise Tm fiber pulse sources injected into many varieties of soft glass- or heavy metal oxide-based highly nonlinear fibers can be utilized. Such soft or heavy metal oxide glass highly nonlinear fibers can, for example, comprise fluoride, lead-glass, bismuth, chalcogenide or tellurite based fibers. The corresponding fibers made from these glasses have preferably a dispersion flattened profile. For example, preferably the fibers will have a value of dispersion <|100| $ps^2$/km in a range extended to ±100 nm from the center wavelength of the utilized laser source; more preferably, the range will be ±200 nm and most preferably the range will be ±500 nm.

As an alternative to supercontinuum generation in soft glasses, highly nonlinear waveguides, such as for example silicon, bismuth, chalcogenide, GaAs, LiNbO$_3$ or GaP based waveguides can be utilized.

Highly coherent supercontinuum spectra can also be generated in quasi-phase matched crystalline materials, such as periodically poled LiNbO$_3$, (PPLN), optically patterned GaAs or GaP just to name a few examples. Preferably, a waveguide structure is implemented. The supercontinuum spectra generated in these waveguides can be highly coherent for wavelength spans exceeding one octave. Preferably laser sources are being implemented that operate close to the zero-dispersion wavelength of these quasi-phase matched nonlinear crystals. For PPLN waveguides pulse sources emitting in the 2000 nm wavelength region can be implemented for supercontinuum generation.

The exploitation of self-frequency shifting in waveguides further allows the construction of tandem supercontinuum sources based on the injection of the output from a first highly nonlinear waveguide into a soft glass, highly nonlinear fiber for extended spectral coverage in the mid IR.

Low noise, highly coherent supercontinuum sources can be utilized in many applications. They can serve, for example, as low cost alternatives to optical parametric oscillators and amplifiers. Also low noise supercontinuum sources are of great benefit in spectroscopy applications such as Fourier transform spectroscopy or multi-heterodyne spectroscopy as well as linear optical sampling. In fact any measurement technique involving some form of coherent detection scheme with supercontinuum pulses as the local oscillator can greatly benefit from a low noise characteristic.

As an example, a coherent supercontinuum source may comprise a low noise fiber-based pulse source generating an output at a central wavelength >1700 nm, the output including at least one pulse having a pulse width <1 ps. Such a pulse source can be based on a core-pumped mode locked Tm fiber laser. A highly nonlinear material receives the output from the source and generates a coherent supercontinuum. A high level of coherence may be characterizable by optically interfering a part of the supercontinuum spectrum with a single frequency laser and observing a beat signal in the radio frequency domain with a high signal/noise ratio. Alternatively an f-2f interferometer can be used to verify the level of coherence.

In some embodiments the fiber based pulse source may operate at a repetition rate of at least about 1 GHz. In some embodiments the supercontinuum bandwidth may exceed 1.1 octaves. In some embodiments a nonlinear waveguide may be utilized for self-frequency shifting the output of the source to wavelengths >2200 nm, followed by supercontinuum generation with a highly nonlinear material.

Low noise, highly coherent supercontinuum sources are further of great interest in imaging applications as well as micro-spectroscopy. Imaging applications of low noise supercontinuum sources comprise optical coherence tomography, all variations of confocal fluorescence microscopy and super resolution microscopy, such as stimulated emission depletion microscopy (STED). Other imaging applications comprise all varieties of multi-photon microscopy, such as for example multi-photon microscopy based on two photon and three photon fluorescence, surface second harmonic generation, third harmonic generation, coherent anti-Stokes Raman scattering as well as stimulated Raman scattering. Micro-spectroscopy applications can comprise for example mid-IR absorption spectroscopy as well as tip enhanced spectroscopy.

One aspect of the present invention features a method for coherent detection, wherein a coherent supercontinuum induces coherent signal emission which is analyzed. In another aspect the invention features a method for lock-in detection in which a supercontinuum is spectrally modified by a sample under test. The modified spectrum is then analyzed at the modulation frequency of the lock in detection system. In another aspect the present invention features a method for determining a characteristic of a sample which includes illuminating a sample with at least part of a coherent supercontinuum, detecting a response produced by the sample, and determining a characteristic of the sample based upon the response. In another aspect the present invention features a method for determining a characteristic of a sample using multi-heterodyne detection in which two coherent supercontinuum spectra are generated.

DETAILED DESCRIPTION

The present invention relates to compact high brightness broadband mid IR coherent fiber light sources and exemplary applications. Incoherent mid-IR supercontinuum generation was discussed in U.S. Pat. No. 7,519,253, entitled 'Broadband or Mid-Infrared Fiber Light Sources', to Islam. Coherent supercontinuum generation based on injection of sub 100 fs pulses into soft glass fibers and providing an output extending to wavelengths from 3-20 μm in soft-glass fibers such as fluoride, tellurite, bismuth or chalcogenide fibers was disclosed in U.S. patent application Ser. No. 12/399,435, entitled "Optical scanning and imaging systems based on dual pulsed laser systems", to Fermann et al., now published as U.S. Patent Application Pub. No. 2010/0225897. Detailed theoretical investigations of supercontinuum generation and the coherence of supercontinuum generation in telluride photonic crystal fibers were presented by W. Q. Zhang et al., 'A genetic algorithm based approach to fiber design for high coherence and large bandwidth supercontinuum generation', Opt. Expr., vol. 17, pp. 19311 (2009). Ultra-flat dispersion profiles were suggested for the generation of wide band coherent supercontinuum spectra. However, the disclosed fibers are extremely difficult to manufacture. Although the use of 100 fs pulses for coherent continuum generation was suggested, no actual pulse source providing such 100 fs pulses was disclosed. Moreover, a fiber laser source for supercontinuum generation was not considered. In related work presented in Buccoliero et al., Appl. Phys. Lett., vol. 92, pp. 061106 (2010) results assuming a Tm fiber laser generating 5 ps pulses for supercontinuum generation in a tellurite photonic crystal fiber were discussed, but only pulses with a pulse width of 5 ps were considered. Coherent supercontinuum spectra were generated with a low noise fiber pulse source emitting at wavelengths >1700 nm, and disclosed in U.S. patent application Ser. No. 13/026,762, to Fermann et al., entitled "Compact, coherent, and high brightness light sources for the mid and far IR", filed Feb. 14, 2011 (the '762 application), the contents of which are hereby incorporated by reference in their entirety. A Tm fiber-based mode locked pulse source delivering sub 100 fs pulses was also described therein.

Figure 1:
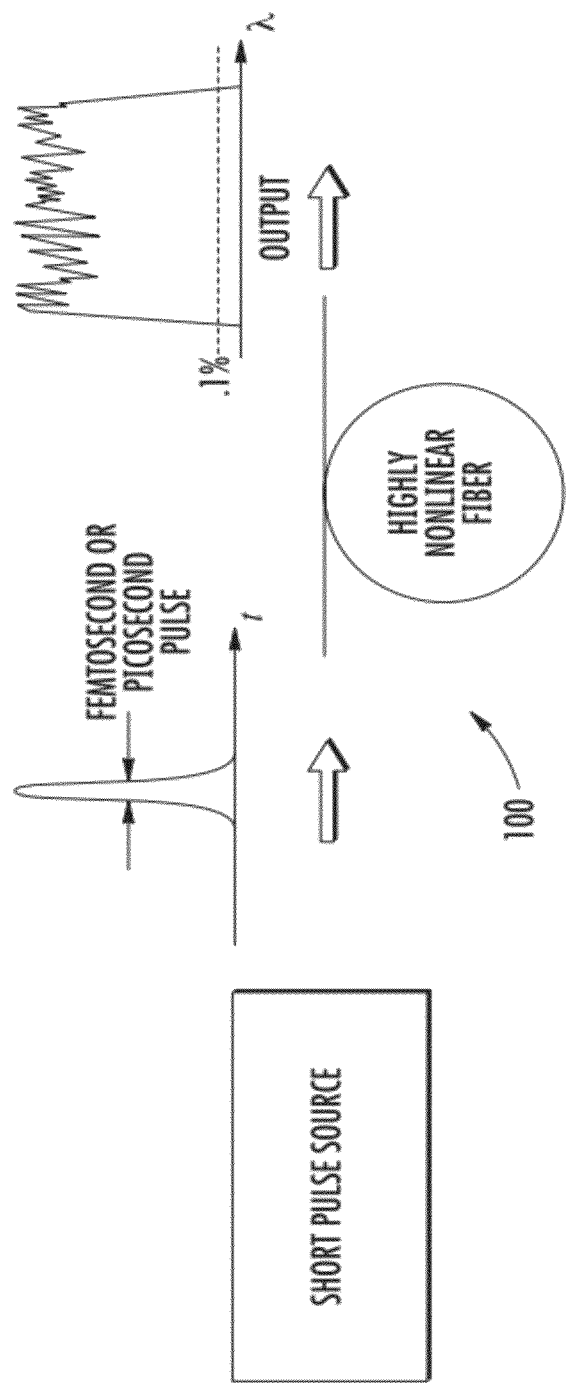
FIG. 1 schematically illustrates a generic embodiment of a low noise broadband supercontinuum source implementing a source emitting at wavelengths >1700 nm and a highly nonlinear fiber.

FIG. 1 illustrates a generic design of a low noise, broadband, highly coherent supercontinuum source 100 implementing a highly nonlinear fiber in conjunction with a short pulse source operating near 2000 nm. In operation the pulse characteristics of the short pulse source, combined with properties of the nonlinear fiber, produce a highly coherent supercontinuum.

The short pulse source can be any low noise laser source operating at wavelengths >1700 nm producing pulses with pulse widths <1 ps, more preferably pulse widths <300 fs, and most preferably pulse widths <100 fs. Appropriate pulse sources can, for example, comprise mode locked fiber lasers, mode locked semiconductor or solid state lasers.

When using mode locked fiber or solid-state lasers as pulse sources, low noise operation can be ensured by implementing single-frequency pump lasers or pump sources based an amplified spontaneous emission. Such low noise pump sources do not exhibit a multi longitudinal or multi-transverse mode structure such as, for example, pump lasers based on broad stripe multi-transverse mode semiconductor lasers or fiber lasers exhibiting a multi-moded longitudinal mode structure. By way of mode beating in such multi-mode pump lasers, the noise levels of the generated continuum due to amplitude to phase noise coupling in the supercontinuum fibers are increased, in turn reducing their coherence.

In one embodiment a Tm fiber laser based short pulse source can be used. An appropriate short pulse source was disclosed in the aforementioned '762 application.

In at least one embodiment a single mode output beam from a short pulse source is coupled into the highly nonlinear fiber and mode matched to the non-linear fiber using mode matching bulk and/or integrated optics, direct splicing, and/or fiber tapers. The highly nonlinear fiber can be tapered to simplify and stabilize coupling to the source. The highly nonlinear fiber can also be spliced to short sections of optical fiber with increasing mode diameter in the upstream direction of the highly nonlinear fiber to simplify coupling. Also the highly nonlinear fiber can be tapered or more than one highly nonlinear fiber can be used to further shape the continuum output, i.e. several highly nonlinear fibers can be concatenated.

Figure 2A:
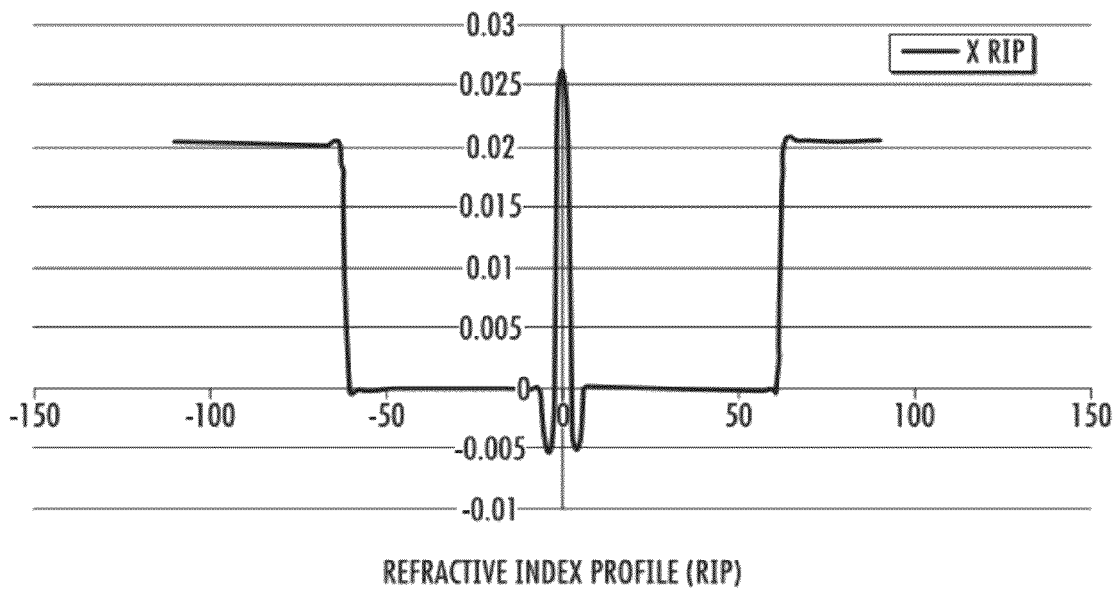
FIG. 2a is a plot of a measured refractive index profile of a highly nonlinear germanium doped conventional solid silica glass fiber for supercontinuum generation with a source operating near the 2000 nm wavelength range.

An example of a refractive index profile of an appropriate highly nonlinear fiber for highly coherent supercontinuum generation in a spectral range from 900-2700 nm is shown in FIG. 2a. The y axis scale denotes the difference in refractive index from the refractive index of the cladding glass and the x-axis denotes the radial position on a μm scale. The fiber is designed for supercontinuum generation using laser sources operating in the 1700-2300 nm wavelength range with relatively low energy pulses, for example pulse energies <100 nJ. The shape of the refractive index profile is known as a W-profile in the state of the art. The refractive index profile is obtained by co-doping the core section with high levels of Germania, and co-doping the surrounding depressed cladding section with fluorine, which is beneficial in obtaining a dispersion flattened refractive index profile. Such fibers can be designed with a dispersion of <|10| $ps^2$/km in a range from 1500-2500 nm. In contrast the dispersion variation of silica glass in this wavelength range is around 25 times larger.

The spectral extent of coherent supercontinuum generation may further be increased by concatenation of additional highly nonlinear fibers as well as appropriate tapering of the implemented highly nonlinear fibers.

For coherent supercontinuum generation a low noise short pulse Tm fiber source producing pulses with a pulse width <1 ps is conveniently coupled into the highly nonlinear fiber using techniques as discussed above. Improved coherence can be obtained with a pulse width <300 fs and further improved coherence can be obtained with a pulse width <100 fs. Such a Tm source was disclosed in FIGS. 3 and 8 and associated text of the '762 application. Such sources can also be directly spliced to the highly nonlinear fiber allowing for a very compact construction.

To ensure a high level of coherence, a core pumped Tm fiber oscillator producing 100 fs pulses and a core pumped Tm fiber amplifier can be used. The Tm fiber amplifier can be nonlinear with a level of self-phase modulation >1.5π inside the amplifier to enable nonlinear pulse compression to around 70 fs at the amplifier output.

In contrast, the inventors observed, when using a nonlinear cladding pumped Tm amplifier, the level of coherence in the generated supercontinuum was severely degraded. The reason is amplitude to phase noise coupling in the supercontinuum fibers due to mode-beating in the multi-mode semiconductor pump source used for cladding pumping. However, an acceptable level of supercontinuum coherence can be obtained by using linear cladding pumped Tm fiber amplifiers, where the maximum level of self-phase modulation is limited to 1.5π.

As shown in F. A. Oguama et al., 'Simultaneous measurement of the Raman gain coefficient and the nonlinear refractive index of optical fibers: theory and experiment', J. Opt. Soc. Am. B, vol. 22, 426 (2005), the nonlinear refractive index $N_2$ of optical fibers increases with the Germania content, therefore, the incorporation of Germania into the core of a PCF increases the nonlinear refractive index of such fibers and minimizes the pulse energy requirements for supercontinuum generation.

It is well known in the state of the art that the coherence of a generated supercontinuum can be approximately described by the first order coherence g(ω) as a function of optical frequency ω in the supercontinuum spectrum defined as $$g(\omega) = \frac{|\langle A_i(\omega) A_j^*(\omega)\rangle_{i\neq j}|}{\sqrt{\langle |A_i(\omega)|^2\rangle \langle |A_j(\omega)|^2\rangle}}, \quad (1)$$

where $A_{i,j}(\omega)$ is the amplitude of the supercontinuum spectrum generated by the i'th and j'th pulse, where the integers are randomly selected within the pulse train. The characterization of supercontinuum spectra with a coherence function g(ω) or g(λ) (where λ is the corresponding wavelength at optical frequency ω) was for example used in W. Q. Zhang et al., 'A genetic algorithm based approach to fiber design for high coherence and large bandwidth supercontinuum generation', Opt. Expr., vol. 17, pp. 19311 (2009) and is not further described here. However, eq. (1) as used by Zhang does not account for excess noise in the actual pulse source, which needs to be characterized separately and can vary strongly from pulse source to pulse source. A pulse source can be shot noise limited, but still have very large phase noise. Experimentally, the first order coherence can be approximately measured, including the contribution from the pulse source, using a Mach-Zehnder interferometer, where two subsequent pulses from the pulse source are interfered and the visibility of the generated spectral interferogram is observed as a function of optical frequency, where $$g_n(\omega) \approx \frac{I_{max}(\omega) - I_{min}(\omega)}{4\sqrt{I_1(\omega)I_2(\omega)}}. \quad (2)$$

Here $I_{max,min}(\omega)$ are the max and min spectral intensity in the observed spectral interferogram respectively and $I_{1,2}(\omega)$ are the spectral intensities obtained in the two arms of the Mach-Zehnder interferometer respectively. This measurement technique is well known in the state of the art and does not need any further explanation; for example it was described with respect to FIG. 10a in U.S. Pat. No. 6,775,447 to Nicholson et al. To distinguish $g_n(\omega)$ from g(ω) for the purposes of the following discussion we refer to $g_n(\omega)$ as next neighbor coherence.

For our purpose, and unless otherwise specified, the optical supercontinuum bandwidth is to be understood as the spectral bandwidth measured between the two most extreme spectral points where the generated spectral density is at least about 0.1% of the peak spectral density in the continuum. Alternatively, we refer to these extreme spectral points as the −30 dB points.

Figure 3A:
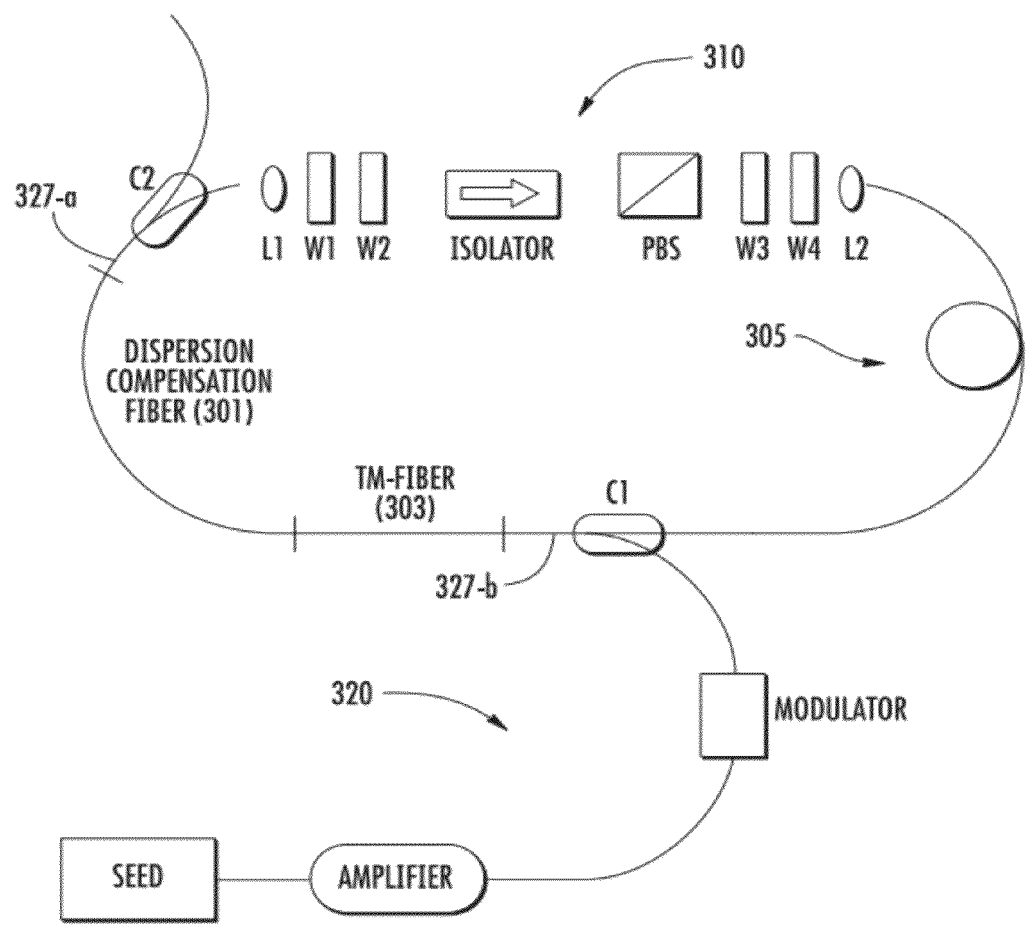
FIGS. 3a and 3b schematically illustrate exemplary fiber-based, low noise pulsed oscillator/amplifier arrangements suitable for use in a broadband supercontinuum source.

Several components of a passively mode locked Tm fiber oscillator optimized for the generation of short pulses and broad coherent spectra are shown in FIG. 3a., a configuration also disclosed in the '762 application. Tm oscillator cavity 310 is pumped with pump source 320. In this example, pump source 320 comprises a single-mode seed laser such as a low noise single-frequency fiber laser or a single-frequency diode laser operating in the 1500-1650 nm wavelength region in order to overlap with the Tm fiber absorption band in this region. When ultra-low noise is not required an Er-fiber laser operating in this wavelength region can also be used as a pump source. The single-frequency fiber seed laser is further amplified in an Er-fiber amplifier and used to pump the Tm fiber laser cavity. The Er-fiber pre-amplifier pump is directed into the Tm fiber laser cavity 310 via an optional amplitude modulator and fiber coupler C1.

Instead of a Tm fiber oscillator, a Tm:Ho fiber oscillator or a Ho fiber oscillator can also be implemented. Appropriate modifications of the pump sources are then also required. For example a Ho fiber can be pumped at 1150 nm with an Yb fiber laser as is well known in the state of the art.

The Tm fiber laser cavity 310 is configured as a uni-directional ring cavity comprising the Tm fiber, coupler C1 for pump coupling and coupler C2 for output coupling. The ring laser is further passively mode locked using nonlinear polarization evolution. Such passively mode locked uni-directional fiber ring cavities were for example described in U.S. Pat. No. 5,515,194 ('194). The cavity further includes collimation lenses L1, L2 and waveplates W1, W2, W3 and W4 configured as quarter wave or half waveplates. The cavity further includes an isolator and a polarization beam splitter PBS. The Tm fiber 303 is spliced on one end to standard single-mode fiber 327-b as for example Corning SMF-28 fiber, as well known in the state of the art. Couplers C1 and C2 are also configured with standard single-mode fiber, which is referred to here as pigtail fiber, and used to couple pump light into the cavity and extract an output therefrom. On the other end the Tm fiber is spliced to a length of dispersion compensation fiber 301 which is connected to coupler C2 with single mode fiber 327-a. The cavity further includes a repetition rate controller 305 in which a fiber coil is made from pigtail fiber wound onto a piezoelectric transducer for repetition rate control. Such elements for repetition rate control are well known.

The laser system of FIG. 3a produces the shortest pulses when the overall cavity dispersion inside the cavity 310 is approximately zero. More generally, in order to generate the shortest possible pulses with the lowest amount of carrier phase noise the $2^{nd}$ order dispersion of the cavity should be close to zero or in a range of +/−20,000 fs$^2$ per meter of intra-cavity length. Preferably, such low values of intra-cavity $2^{nd}$ order dispersion are obtained using fibers with different values of $2^{nd}$ and $3^{rd}$ order dispersion. Generally, standard single mode undoped pigtail fiber and the Tm fiber have similar values of $2^{nd}$ and $3^{rd}$ order dispersion, at least the sign of the $2^{nd}$ and $3^{rd}$ order dispersion will be the same for Tm fiber oscillators operating at or near a 2000 nm wavelength, for example in a wavelength range from about 1700 to about 2500 nm. One reason is that there are limits to the dopant concentrations that are allowed for glass forming dopants such as $Al_2O_3$ and $P_2O_5$ in silica fibers without inducing devitrification. Because $Al_2O_3$ and/or $P_2O_5$ provide for high solubility of Tm in silica fibers, the numerical aperture of such Tm-doped fibers is typically limited to about 0.25, thus limiting the amount of waveguide dispersion that can be incorporated into such fibers. In contrast, for the rare-earth free dispersion compensating fiber, $GeO_2$ can be used as the main dopant, allowing for much larger values of fiber numerical aperture (up to around 0.40) and large values of waveguide dispersion.

Hence in order to provide very low, nearly minimum intra-cavity dispersion, fibers that compensate for the dispersion of the Tm fiber, or any standard undoped single-mode pigtail fibers, can be utilized in various implementations. These dispersion compensating fibers can be designed with $2^{nd}$ and $3^{rd}$ order dispersion values that have the opposite sign to the corresponding values in the Tm and pigtail fibers. For example, a plurality of fiber sections may be utilized, each section having at least one length of fiber, wherein:

a first fiber section has a positive dispersion value, $D2_1$;

a second fiber section has a negative dispersion value, $D2_2$;

the first fiber section has a negative third order dispersion value, $D3_1$; and the second fiber section has a positive third order dispersion value, $D3_2$.

Also, a particular fiber section need not include the same number of fibers as another section to produce net (or average) positive or negative dispersion values, as indicated above.

In addition, ideally, the ratios of $2^{nd}$ and $3^{rd}$ order dispersion should satisfy the following relation:

$$(D2_1/D3_1)/(D2_2/D3_2) \sim 1,$$

where $D2_1, D3_1, D2_2, D3_2$ are the values of second and third order dispersion in the Tm fiber and the dispersion compensating fiber, respectively. In some preferred embodiments the ratios of the $2^{nd}$ and $3^{rd}$ order dispersion further approximately satisfy:

Preferably:

$$0.2 < (D2_1/D3_1)/(D2_2/D3_2) < 5.$$

More preferably:

$$0.5 < (D2_1/D3_1)/(D2_2/D3_2) < 2.$$

Most preferably:

$$0.7 < (D2_1/D3_1)/(D2_2/D3_2) < 1.3.$$

As mentioned above, in order to generate the shortest pulses with minimal carrier phase noise the overall value of second order dispersion should be in a range of about +/−20,000 fs$^2$ per meter of intra-cavity fiber length. Generally, a fiber cavity may comprise more than two different fiber designs. In such implementations it is sufficient to lump fibers with positive dispersion and fibers with negative dispersion into two different fiber sections with average values of $2^{nd}$ and $3^{rd}$ order dispersion.

Another alternative for obtaining fibers with opposite signs of $2^{nd}$ order dispersion, but similar $2^{nd}/3^{th}$ dispersion ratios, can be accomplished with the implementation of photonic crystal fibers. For example, Tm doped photonic crystal fibers can be manufactured with positive dispersion by the addition of small air-holes surrounding the central doped fiber section as shown in FIG. 2 of '762 and appropriate control of the core diameter. A fiber with a Tm doped core surrounded by six air-holes embedded in a larger silica fiber cladding is shown in '762. Negative values of third order dispersion can thus also be obtained. Alternatively, undoped photonic crystal fibers can be manufactured which similarly allow for control of $2^{nd}$ and $3^{rd}$ order dispersion. Such undoped photonic crystal fibers can be based on silica glass material.

When the ratios of $2^{nd}$ to $3^{rd}$ order dispersion are closely matched and the active dispersion of the cavity is set approximately to zero (by selecting appropriate fiber lengths) the generated pulses are essentially bandwidth limited somewhere inside the cavity. Positively chirped pulses are generated at the output of coupler C2, assuming that the dispersion of the pigtail fiber of coupler C2 is very much smaller than the dispersion of the intra-cavity dispersion compensating fiber 301. Near bandwidth limited pulses are then obtained by appropriate selection of the pig-tail fiber lengths at the output of coupler C2. Here the coupler pigtail fibers of coupler C2 are preferably selected to have similar values of $2^{nd}$ and $3^{rd}$ order dispersion as the intra-cavity Tm doped fiber 303. Moreover, in contrast to the '194 patent, the laser system can be operated as essentially a soliton laser with minimal intra-cavity pulse width changes by adjusting the overall active cavity dispersion to be slightly negative while still producing very short pulses.

The laser system can also be operated as a similariton laser as, for example, discussed in U.S. Pat. No. 7,782,910 and can produce approximately parabolic pulses when operating the laser with overall positive cavity dispersion. Parabolic pulse formation is facilitated, because the Tm fiber and the fiber pigtails can have a much larger core area than the dispersion compensating fiber and thus pulse shaping is dominated by the dispersion compensating fiber resulting in parabolic pulse formation. More generally, this allows for parabolic pulse formation in fiber laser cavities using negative dispersion gain fiber rather than positive dispersion gain fiber, in contradistinction to conventional parabolic pulse generation techniques.

Apart from operation with large optical bandwidths and minimum amount of carrier phase noise, another advantage of operation near the zero dispersion point is that near bandwidth limited pulses can be easily obtained at the output pigtail of coupler C2. A reason is, that for a certain fiber pig-tail length, both $2^{nd}$ and $3^{rd}$ order dispersion of the output pulses are automatically compensated, as discussed above. Simultaneous $2^{nd}$ and $3^{rd}$ order dispersion compensation is difficult in external fiber pigtails connected to passively mode locked oscillators unless complex and expensive pulse shaping elements are used.

In the example of FIG. 3a, a mode locked fiber comb ring laser using nonlinear polarization evolution for modelocking was shown. However, when modelocking is utilized for generation of pulses with pulse widths <150 fs or spectral bandwidths >60 nm, similar considerations for the selection of values of $2^{nd}$ and $3^{rd}$ order dispersion of the intra-cavity fibers apply. Notably, the considerations also apply when using any modelocking technique. For example, ring laser architectures with reduced polarization sensitivity can be constructed with the additional use of a graphene or carbon-nano-tube saturable absorber anywhere in the cavity. Such saturable absorbers can for example also be incorporated via evanescent field coupling in a fiber taper as well known in the state of the art and for example discussed in K. Kieu and M. Mansuripur, 'Femtosecond laser pulse generation with a fiber taper embedded in carbon nanotube/polymer composite', Opt. Lett., 32, 2242-2244 (2007).

Additional Tm amplifiers (not shown) can further be spliced onto the output of coupler C2. The $2^{nd}$ and $3^{rd}$ order dispersion values of the Tm amplifiers can be compensated with appropriate lengths of dispersion compensating fiber inserted in front of the amplifiers. With optimum selection of fibers, and also using nonlinear compression inside the Tm amplifiers, pulses shorter than 50 fs, and as short as 10-30 fs, at pulse energies of many tens of nJ can be generated with such systems.

Figure 3B:
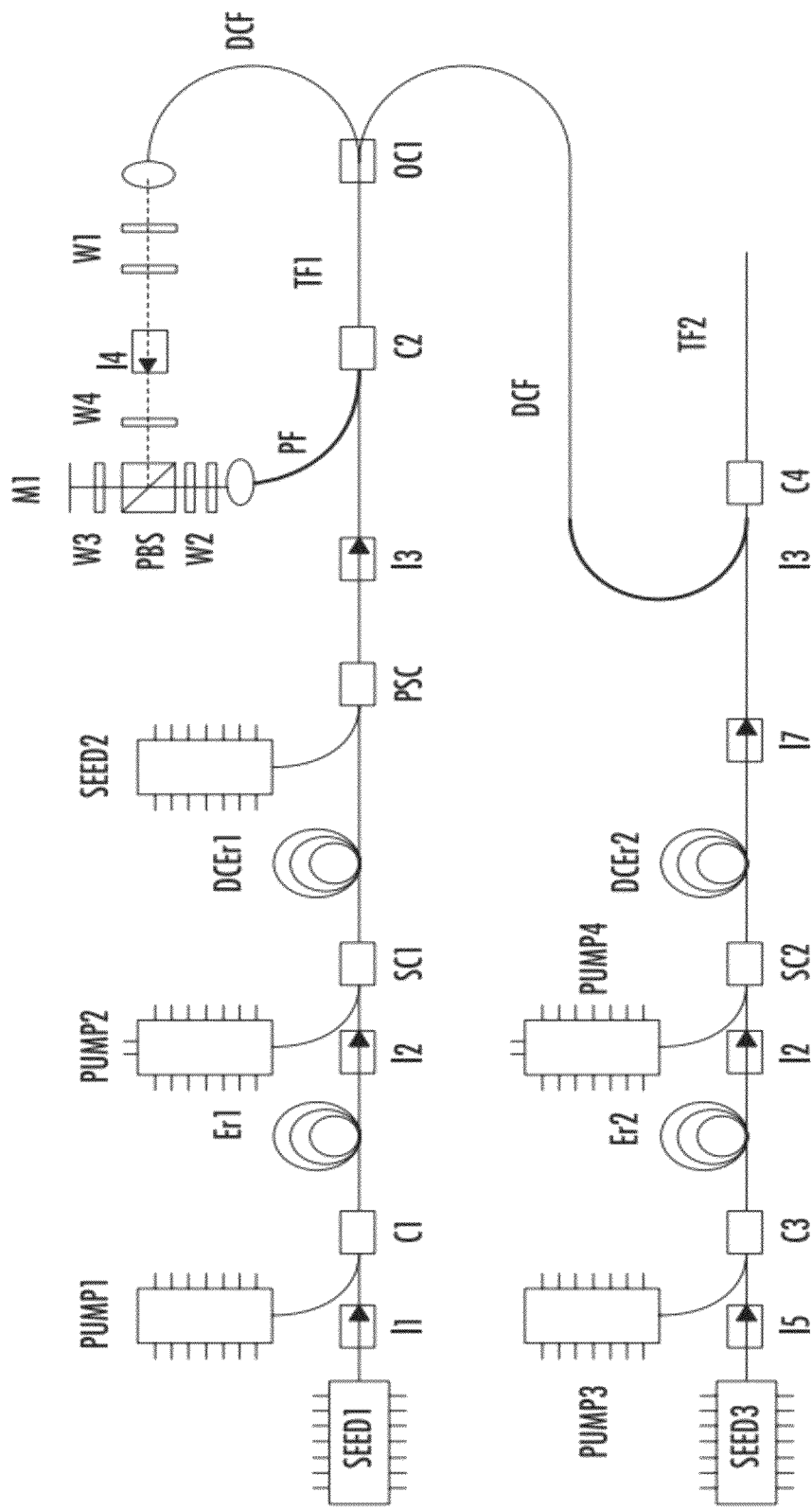

A detailed example of a fiber-based oscillator/amplifier suitable for an ultra-broadband, highly coherent supercontinuum source is shown in FIG. 3b. It comprises two erbium fiber based pump sources, a mode locked Tm fiber oscillator and a nonlinear Tm fiber amplifier. The first erbium pump source (pump1) is used for pumping the mode locked Tm fiber oscillator; it comprises a single frequency semiconductor seed laser (seed 1) operating at a wavelength of 1563 nm. The seed laser output and the output of a 980 nm diode pump laser are combined via wavelength division multiplexing coupler C1 and the seed signal is subsequently amplified in core pumped erbium amplifier Er1. The seed signal is further amplified in erbium amplifier DCEr1 to an output power of around 3 W. Here the erbium amplifier is double cladded and cladding pumping is used to obtain a high power level. A star-coupler SC1 (as well known in the state of the art) is used to combine the seed signal with the multi-mode 980 nm pump light for DCEr1. The output of the cladding pumped amplifier DCEr1 is further polarization multiplexed and combined with the output of a second seed source (seed 2, also operating at 1563 nm) via polarization multiplexing coupler PSC to allow for rapid modulation of the total pump power to the mode locked Tm fiber oscillator via modulation of the power of seed source (seed 2). Rapid modulation of the pump power is optional and only included here to enable precision locking of the carrier envelope offset frequency in the oscillator to an external radio-frequency signal or an optical frequency reference, thereby enabling the construction of a Tm fiber based frequency comb source. Instead of polarization multiplexing coupler PSC, a wavelength division multiplexing coupler and a seed source (seed 2) operating at a different wavelength, such as 1620 nm can also be used for rapid modulation of the pump power to the Tm oscillator. Such an implementation is not separately shown. However, other system designs for the construction of frequency comb sources are also possible as for example discussed in the '762 application. Appropriate isolators I1, I2 and I3 are used between the various amplification stages.

The mode locked Tm fiber oscillator is set up similarly as already discussed with respect to FIG. 3a (and corresponds to FIG. 1 of the '762 application). The Tm fiber oscillator was designed to operate at a repetition rate of around 75 MHz and produced sub 100 fs pulses with a center wavelength of 1950 nm and an output power up to 30 mW. The oscillator further comprised a 30 cm length of Tm fiber (TF1), standard single mode step index pigtail fiber (PF) and a length of dispersion compensation fiber (DCF) used for dispersion compensation of both $2^{nd}$ and $3^{rd}$ order dispersion within the oscillator. Appropriate waveplates (W1 representing both a quarter and a half-wave plate) and similarly W2 were used for polarization control and to enable modelocking via nonlinear polarization evolution. The pump light was injected into the oscillator via wavelength division multiplexing coupler C2 and the output from the oscillator was extracted via output coupler OC1.

The oscillator of FIG. 3b further included an optional sigma section represented by mirror M1, polarization beam splitter PBS, quarter waveplate W3 and half waveplate W4 that was used to enable rapid repetition rate control via longitudinal variations of the spatial location of mirror M1. In order to enable modulation of the position of mirror M1, M1 was further mounted onto a piezo-electric transducer. Isolator 14 ensured uni-directional operation of the mode locked fiber laser cavity.

The present oscillator design is only to serve as an example and as discussed in the '762 application, other oscillator designs can also be implemented.

The second erbium fiber pump source in FIG. 3b comprised a third semiconductor seed source (seed 3) also operating at 1563 nm, and amplified in core pumped erbium amplifier Er2 and cladding pumped erbium amplifier DCEr2 using similar 980 nm pump sources as described above. Appropriate isolators I5, I6 and I7 provide seed source isolation. The output of the oscillator and the second erbium pump are combined via wavelength division multiplexing coupler C4 and the thulium oscillator is subsequently amplified in a core pumped Tm amplifier fiber TF2 with a length of 50 cm. An additional isolator (not shown) could further be inserted between the Tm oscillator and the Tm amplifier. The length of the dispersion compensating fiber DCF (based on the same design as used for the intra-cavity DCF) was then optimized to ensure higher-order soliton compression at the output of (non-linear) Tm amplifier TF2 producing 70 fs pulses with an average power of 600 mW. The output of Tm amplifier fiber TF2 could further be directly spliced to a highly nonlinear silica fiber (as for example, shown in FIG. 2b) for coherent supercontinuum generation. An additional length of standard Corning SMF-28 fiber (not shown) could further be spliced to the output of the supercontinuum fiber to compensate for or adjust any group delay between two selected wavelengths within the continuum separated by an octave. Such a group delay stage is, for example, beneficial in the construction of an f-2f interferometer.

The overall system design follows the following guide lines designed to minimize amplitude to phase noise conversion in any supercontinuum generation and to ensure a highly coherent supercontinuum output. Here we differentiate between the signal S constituting short pulses derived from the mode locked oscillator and a signal amplifier (SA) on the one hand. On the other hand we differentiate pump seed source or pump seeds (PS) that are used at the front end of the pump systems optically pumping the mode locked oscillator or signal amplifier; and pump amplifiers (PA) that are used to amplify the pump seeds. Specifically:
1) The signal generating mode locked oscillator is core pumped.
2) The oscillator PS is derived from a source essentially free of instabilities due to any form of multi-modal structure. (in other words, any such instabilities are negligible).
a) When using a nonlinear SA:
4a) The fiber SA is core pumped. The SA PS is derived from a seed source free of instabilities due to any form of multi-modal structure.
b) When using a linear SA:
4b) The fiber SA can be core or cladding pumped. The SA PS is preferably but not necessarily derived from a seed source free of instabilities due to any form of multi-modal structure.

Also, for all systems, any cladding pumped amplification stages within the oscillator or amplifier PA are linear. When using a cw PS linearity of the amplification is essentially always ensured.

In some implementations a SA may not be required for coherent supercontinuum generation; in this case only the design criteria for the oscillator construction need to be observed for coherent supercontinuum generation.

In various embodiments a supercontinuum source comprises a low-noise fiber-based pulse source in combination with a highly nonlinear material. A low noise fiber source facilitates generation of a highly coherent supercontinuum. By way of example, a preferred seed source for the oscillator pump system is free of instabilities resulting from modal noise, which may be manifested in any form of multi-modal structure. A single-frequency semiconductor seed laser or a single frequency fiber laser can be used in various implementations. Moreover, preferably relaxation oscillations in such a single-frequency fiber laser can be suppressed using some type of active feedback system, for example a noise eater, as well known in the state of the art. Another example would be a source based on amplified spontaneous emission which has no longitudinal or transverse mode structure, such as a fiber amplified spontaneous emission source. By way of example, the root mean square intensity noise (RIN noise) of such a low noise source could be less than about 1% in a frequency range from 1 Hz to 1 MHz.

Figure 4A:
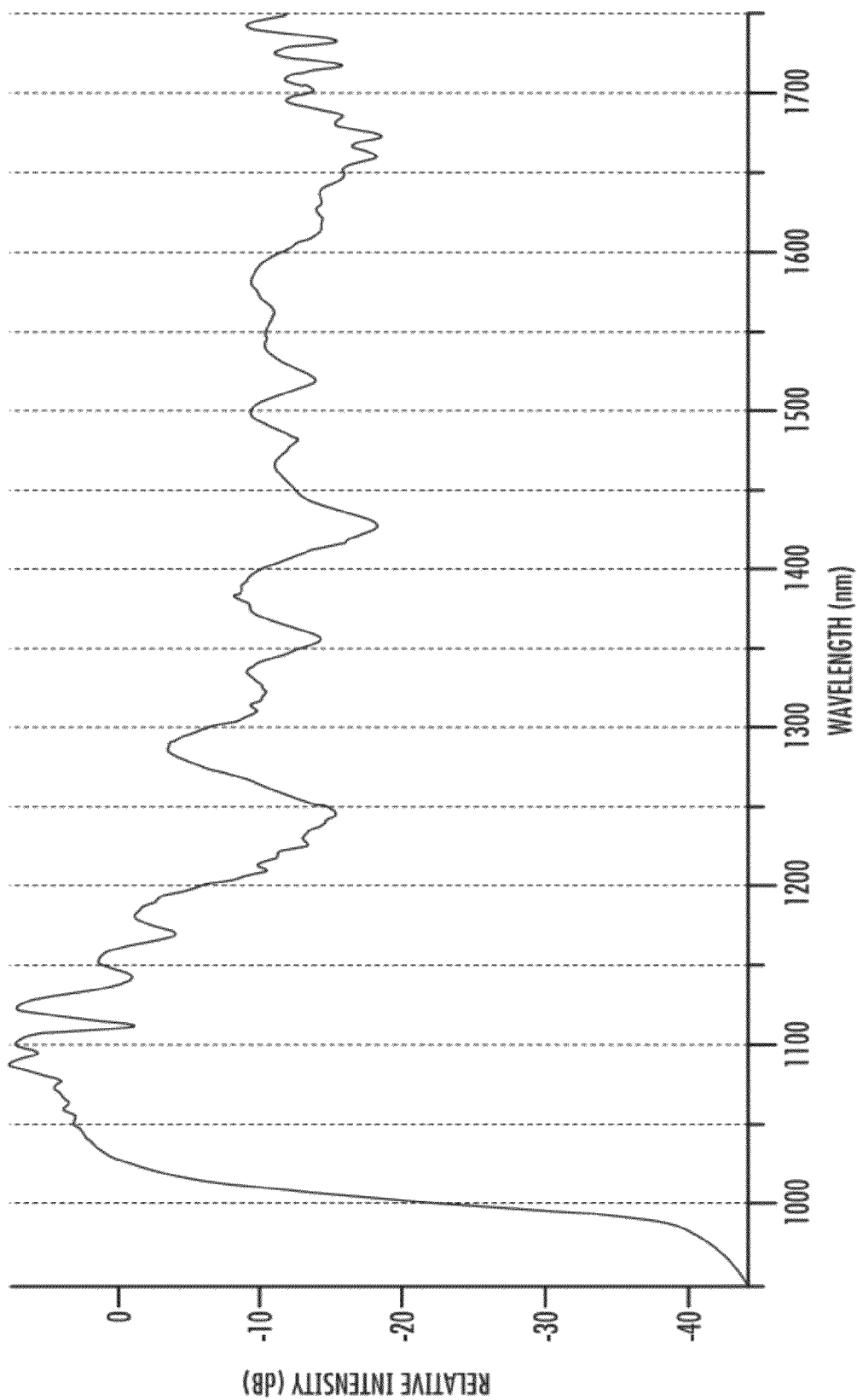
FIG. 4a is plot showing the near IR part of a supercontinuum spectrum generated with a Tm fiber laser in a highly nonlinear silica fiber.

The supercontinuum spectrum generated in the spectral range from 1000-1700 nm with the system of FIG. 3, and a highly nonlinear fiber disposed downstream from the nonlinear Tm amplifier, is shown in FIG. 4a. Other measurements using a different spectrometer showed that the supercontinuum spectrum extended out to wavelengths around 2600 nm; hence the whole continuum covered a spectral range of around 1.3 octaves.

Figure 4B:
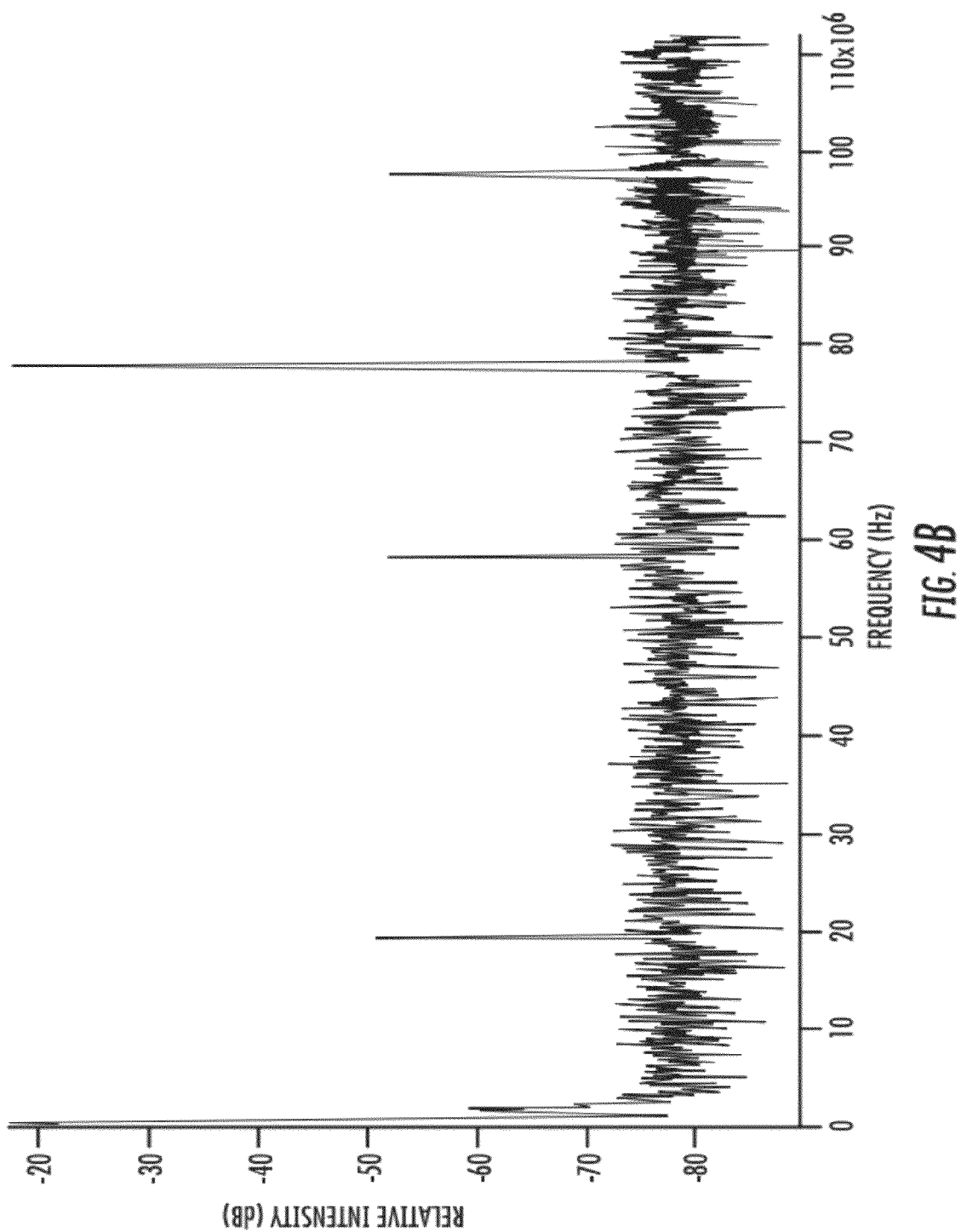
FIG. 4b is a plot illustrating the signal/noise ratio of a radio-frequency beat signal measured between parts of the supercontinuum spectrum and a single frequency laser.
Figure 4C:
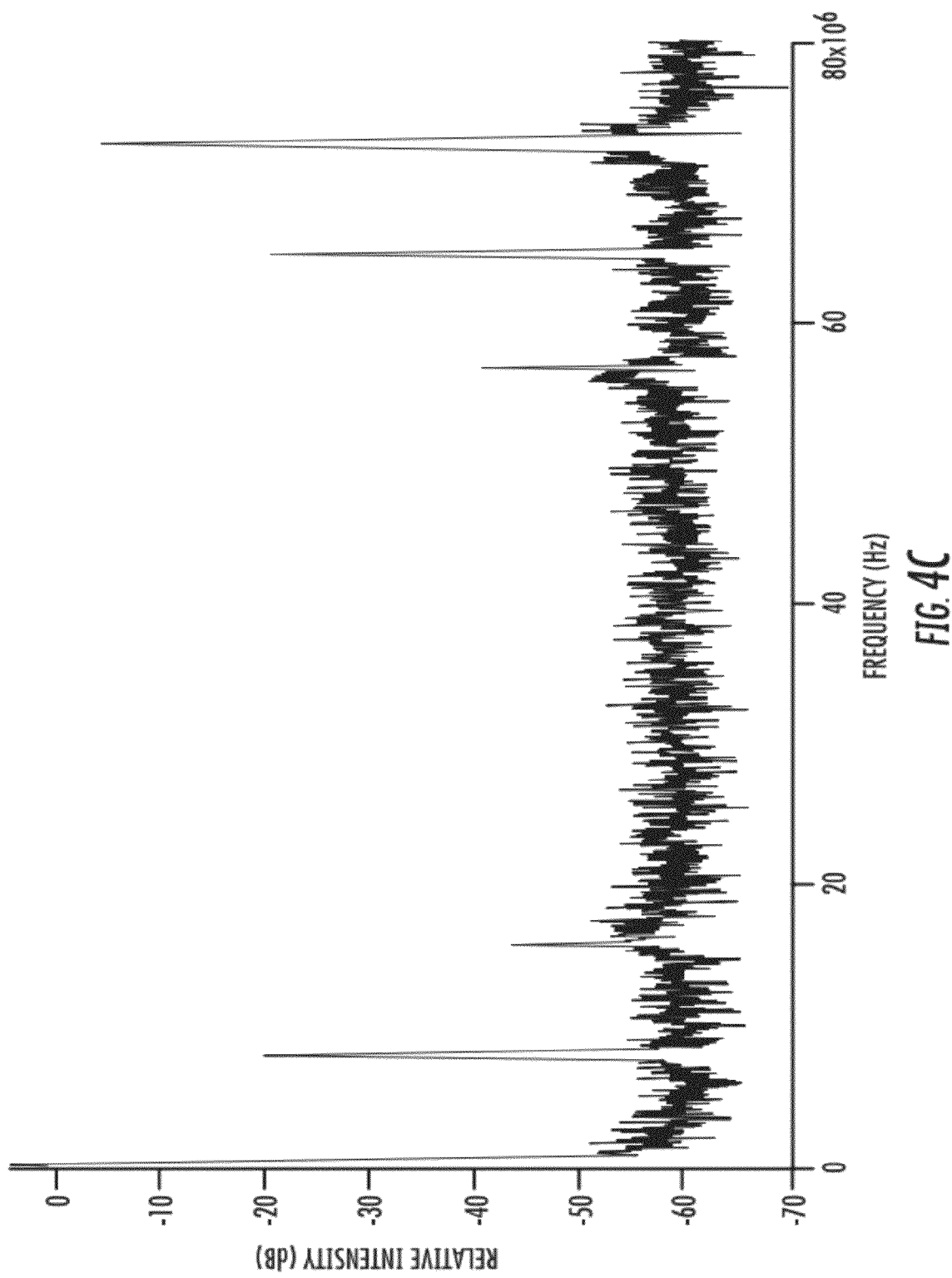
FIG. 4c is a plot illustrating the signal/noise ratio of the radio-frequency beat signal measured between parts of the supercontinuum spectrum when implementing an f-2f interferometer.

The high level of supercontinuum coherence and the low level of phase noise obtained with the highly nonlinear germanium doped solid silica glass SCF having the RIP as shown in FIG. 2a and utilized with the supercontinuum oscillator/amplifier source shown in FIG. 3, was further experimentally verified by beating individual spectral components with a single frequency laser operating at 1033 nm and measuring the beat signal with a radio-frequency (RF) analyzer. Dual balanced detection of the beat signal between the single-frequency laser and the generated continuum could further be implemented for minimization of amplitude noise contributions. The result of this measurement is shown in FIG. 4b, where a S/N ratio of nearly 30 dB was obtained.

In frequency metrology a low level of phase noise means that the S/N ratio of the measured beat signal with a single-frequency laser within the supercontinuum spectrum is high enough to enable phase locking between the single-frequency lasers and individual frequency comb lines within the supercontinuum spectrum. In practice using standard electronics, phase locking is possible when a S/N ratio>20 dB is obtained at 100 kHz spectral resolution on an RF analyzer when measuring the beat signal between the single frequency lasers and an individual comb line within the supercontinuum spectrum. In the following we therefore adopt the definition that high phase coherence at a spectral point within the supercontinuum means a S/N ratio>10 dB is obtainable at 100 kHz spectral resolution on an RF analyzer when measuring the beat signal between a single frequency laser and an individual comb line within the supercontinuum spectrum.

The high level of supercontinuum coherence obtained in the SCF fiber having the RIP as shown in FIG. 2a was strongly dependent on pulse width and the type of Tm fiber system implemented; best results were obtained with injection of very short pulses and using a core-pumped Tm oscillator and a core pumped Tm amplifier. In this example, increased coherence properties were obtained with a pulse width <100 fs, less optimum coherence properties were obtained with pulse widths <300 fs; even less optimum coherence properties were obtained with pulse widths <1 ps; even more degraded coherence properties were obtained with pulse widths >1 ps. A high level of coherence can be important for improving the S/N ratio of any subsequent spectral measurements based on the supercontinuum. Shot noise limited optical sources are highly desirable in such measurement techniques. A coherence value (as defined with respect to eq. (1) or eq. (2) close to unity ensures that no additional noise gets added to the short pulse laser source noise via the process of supercontinuum generation. Hence, provided a shot noise limited source generates the supercontinuum, the generated continuum will also be shot noise limited. On the other hand, if supercontinuum generation produces an excess amplitude noise level of 10 dB above shot noise, a hundred times longer signal averaging time may need to be implemented to achieve the same S/N ratio in signal detection compared to when a shot noise limited source is used. However, shot noise limited performance does not ensure low phase noise, and thus cannot ensure particularly high phase coherence.

Many short pulse sources may produce excess noise levels. In this case coherence in the vicinity of unity ensures that the level of excess noise does not increase in the process of supercontinuum generation which is also highly desirable.

The high level of supercontinuum coherence obtained with the silica fiber having the RIP shown in FIG. 2a is remarkable and is obtained with a dispersion flattened fiber design. Such fibers can produce highly coherent supercontinuum spectra when implementing short pulse sources in the wavelength range from 1700-2500 nm. In some cases dispersion flattening may not be required. For the purposes of the following discussion we refer to a supercontinuum spectrum with a high level of coherence when a next neighbor coherence $g_n(\omega)>0.7$ is obtained.

When using short pulse light sources operating at wavelengths >1700 nm, the use of highly nonlinear silica fibers with a large Germania content also greatly increases the coherence properties of the generated supercontinuum, since it allows the implementation of dispersion flattened highly nonlinear fiber designs. In various preferred embodiments a Germania concentration >10 mole % is desired, a Germania concentration >20 mole % is more desirable, and a Germania concentration >30 mole % is most desirable. Dispersion flattened fiber designs can also be enabled by using a photonic crystal structure to define a core region, a W-refractive index profile or more complex refractive index profiles. Preferably, the highly nonlinear fibers have a value of dispersion <|10| $ps^2$/km in a range extended to ±100 nm from the center wavelength of the laser source; more preferably, the range can be ±200 nm and most preferably the range can be ±500 nm. The use of dispersion flattened fibers maximizes the coherence properties while at the same time keeping the pulse energy requirements relatively low, e.g.: <100 nJ.

Figure 2B:
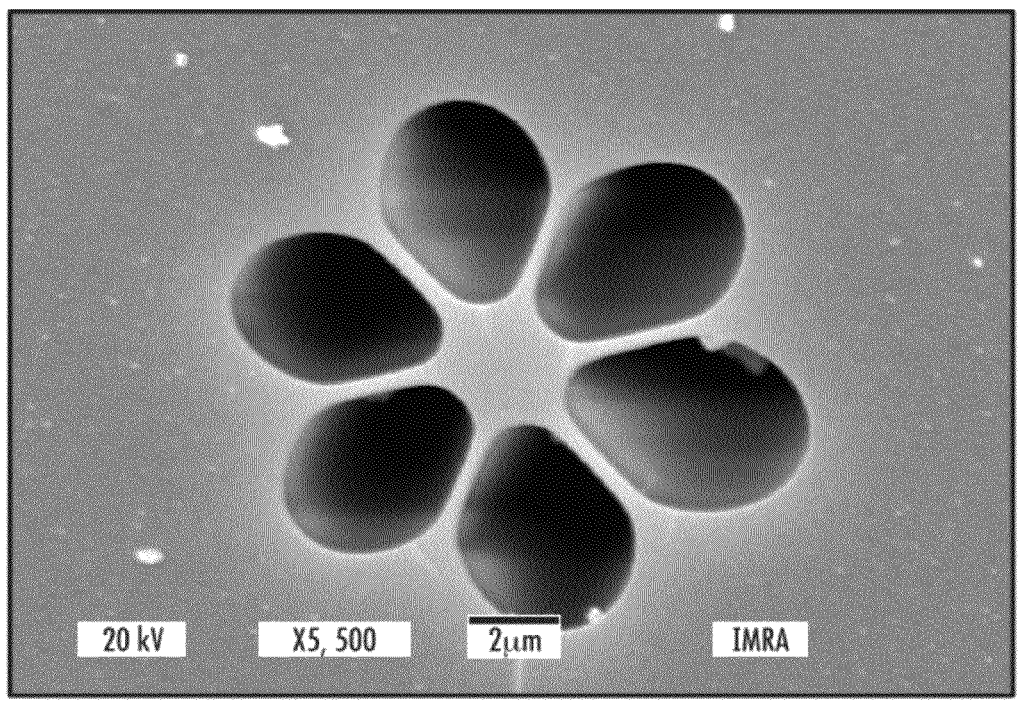
FIG. 2b is a SEM image illustrating a cross section of a highly nonlinear germania doped silica photonic crystal fiber.

An example of a photonic crystal fiber design for a highly nonlinear fiber to be used with a low noise short pulse source operating at wavelength >1700 nm is shown in FIG. 2b. By way of example, an SEM image illustrating an exemplary cross section of such a fiber is shown here. The fiber is based on a silica glass with a central core surrounded by six air holes, and is an example of a photonic crystal fiber (PCF) configuration. During the manufacturing process a germanosilicate glass rod with a high Germania concentration is inserted into the central core region using a stack and draw technique. Such fibers were disclosed in Dong et al., 'Ultra high numerical aperture optical fibers', U.S. Pat. No. 7,715, 672, the contents of which are hereby incorporated by reference. Because of the strong confinement of the fiber mode within the core boundaries, the Germania doped central core region has a very high overlap with the fiber mode. The nonlinearity of the photonic crystal fiber is thus dominantly governed by the nonlinearity of the Germania doped central core region.

In order to increase the spectral coverage of coherent supercontinuum generation to wavelengths >2500 nm, it is desirable to use soft glass- or heavy metal oxide glass-based fibers or to use highly nonlinear waveguides. Such mid IR transmitting glasses can for example be based on tellurite, chalcogenide, SF6, lead or fluoride. However, other glasses can also be used in various embodiments. The coherence of these mid-IR supercontinuum sources can further be maximized by selecting low noise short pulse sources. As is well known in the state of the art, soft glasses can be fabricated with widely different physical, chemical or optical properties depending on the details of the glass composition.

For example, the properties of tellurite and fluorotellurite glass based fibers were recently reviewed in M. D. O'Donnell et al., 'Tellurite and Fluorotellurite Glasses for Fiberoptic Raman Amplifiers: Glass Characterization, Optical Properties, Raman Gain, Preliminary Fiberization, and Fiber Characterization', J. Am. Ceram. Soc., vol. 90, pp. 1448 (2007) and also in FIG. 6.2 of .H. V. Price et al., 'Supercontinuum generation and nonlinearity in soft glass fibers', in chapter VI of J. M. Dudley et al., 'Supercontinuum generation in optical fibers', Cambridge University Press (2010). Specifically, M. D. O'Donell et al. describe the peak Raman gain of FT3 glass as around $8.5 \times 10^{-13}$ m/W, whereas the nonlinear refractive index of FT3 glass is described as $N_2 = 5.9 \times 10^{-19}$ m$^2$/W in W. Q. Zhang et al.

In conjunction with a low noise fiber source operating at wavelengths >1700 a highly nonlinear fiber based on FT3 glass is a good candidate for coherent supercontinuum generation. Another specific example of an appropriate highly nonlinear fiber for coherent supercontinuum generation is a tellurite TBZN glass fiber described in X. Yan et al., 'Transient Raman response and soliton self-frequency shift in tellurite microstructured fiber', Journal of Applied Physics, vol. 108, pp. 123110 (2010).

Alternatively, chalcogenide fibers may be used for coherent supercontinnum Chalcogenide fibers are attractive since they have a further extended optical transmission in the mid IR compared to tellurite glass. Such a chalcogenide fiber was for example described in Hu et al., 'Maximizing the bandwidth of supercontinuum generation in $As_2Se_3$ chalcogenide fibers', Opt. Expr., vol. 18, pp. 6722 (2010).

Generally, the coherence of supercontinuum spectra in the mid IR can be increased in any soft glass or heavy metal oxide glass based highly nonlinear fiber by using dispersion flattened dispersion profiles, however, only a moderate amount of dispersion flattening can be implemented when using a low noise injection source at relative small pulse energies. For example, the fibers can have a value of dispersion $D_2|5|<D_2|100|$ ps$^2$/km in a range extended to ±100 nm from the center wavelength of the utilized laser source. More preferably, the range can be ±200 nm. Most preferably, the range can be ±500 nm. In contrast, Zhang et al. suggested to use fibers with extreme levels of dispersion flattening, where the dispersion was selected to be $D_2$: $D_2<|5|$ ps$^2$/km in a wavelength span exceeding 1000 nm.

The utilization of short pulse sources with an emission wavelength >1700 nm further minimizes detrimental effects from photo darkening and multi-photon absorption in such materials. These short pulse laser sources preferably generates pulse widths <1 ps, more preferably pulse widths <300 fs, and most preferably pulse widths <100 fs. Such short pulse sources can be conveniently based on low noise mode locked Tm fiber lasers and amplifiers as, for example, described above and also disclosed in the '762 application. However, any other suitable short pulse source operating at a wavelengths >1700 nm can be used.

As an alternative to highly nonlinear fibers, highly nonlinear waveguides may also be used for supercontinuum generation. For example, supercontinuum generation was demonstrated in M. R. E. Lamont et al., 'Supercontinuum generation in dispersion engineered highly nonlinear ($\gamma$=10/W/m) $As_2S_3$ chalcogenide planar waveguide', Opt. Expr., vol. 19, pp. 14938 (2008). Generally, the coherence of supercontinuum spectra in the mid IR can be substantially increased in any highly nonlinear waveguide by selecting a dispersion flattened dispersion profile. The waveguides preferably have a value of dispersion <|100| ps$^2$/km in a range extended to ±100 nm from the center wavelength of the utilized laser source. More preferably, the range can be ±200 nm and most preferably the range can be ±500 nm.

The generation of highly coherent supercontinuum spectra is also possible with quasi-phase matched nonlinear crystals and waveguides, where instead of a nonlinear process based on the 3$^{rd}$ order nonlinear susceptibility of an optical material (as used for supercontinuum generation in optical fibers), the 2$^{nd}$ order nonlinear susceptibility is used for spectral broadening. Supercontinuum generation in quasi-phase matched highly nonlinear waveguides can also be highly coherent, producing broad supercontinuum spectra that can exceed an octave. Moreover, a high level of coherence with a coherence value g. >0.7, and $g_n$ close to unity, can also be obtained using quasi-phase matched materials in broad sections of the generated supercontinuum. Supercontinuum generation in quasi-phase matched nonlinear waveguides was first disclosed in Hartl et al., U.S. Pat. No. 7,809,222, entitled 'Laser based frequency standards and their applications'. To obtain broad spectral coverage supercontinuum generation is preferably performed with a short pulse laser source operating near the zero dispersion wavelength of the quasi-phase matched nonlinear crystal. For example, when using nonlinear waveguides based on periodically poled lithium niobate (PPLN), spectral broadening and supercontinuum generation is preferably performed with laser sources operating in the wavelength region near 2000 nm, with Tm fiber laser based pulse sources, for example. Moreover, regions of enhanced spectral density can be generated inside the supercontinuum by utilizing self-frequency shifting (SFS) in such quasi-phase matched waveguides as disclosed in Fermann et al., "Compact, high brightness light sources for the mid and far IR", U.S. Patent Application No. 61/426,327. Supercontinuum sources based on quasi-phase matched materials can produce spectra with a high spectral density. Moreover, the fabrication technology of such quasi-phase matched waveguides, especially with regards to PPLN waveguides has reached a high level of maturity. Thus such waveguides are very attractive for the construction of reliable and coherent mid-IR sources.

Also, SFS can be exploited to shift the wavelength from a fiber based pulse source into a wavelength range, where soft-glasses or heavy-metal oxide glasses have anomalous dispersion. For example from Price et al., (FIG. 6.2b) the zero-dispersion wavelength of bismuth glass is at around 2300 nm and that of a typical tellurite glass is around 2200 nm. Hence, by shifting the wavelength from a fiber laser into the 2200-2600 nm wavelength range as is for example possible by using SFS in a PPLN waveguide, all solid-glass bismuth or tellurite fiber can be implemented for supercontinuum generation. All solid-glass fibers have no air-holes and are therefore more robust than PCF fiber designs. An implementation of such a tandem source, involving a short pulse fiber laser, a PPLN SFS stage and an all-glass supercontinuum fiber is similar to the set-up as shown with respect to FIG. 1, where a PPLN crystal is inserted between the laser source and the nonlinear fiber. Such an implementation is not separately shown. Tandem supercontinuum sources involving SFS and supercontinuum generation in a highly nonlinear waveguide can be conveniently constructed using pulse sources <10 ps.

In some configurations the output from a Tm or Ho fiber laser can be injected directly into a highly nonlinear soft-glass fiber to induce self-frequency shifting or Raman shifting in such fibers. The highly nonlinear fibers can further be tapered slightly to blue shift the zero-dispersion wavelength of such fibers. After self-frequency shifting, a nonlinear doubling crystal can be incorporated in order to generate output at the frequency doubled wavelength. Moreover, by using adjustable self-frequency shifting a wavelength tunable source can be constructed. For example for two photon microscopy applications, the wavelength region from 900-1300 nm is attractive which can be reached by frequency doubling the output from a Tm fiber laser and the frequency shifted output obtained in a soft-glass fiber.

Another application of Tm or Ho fiber lasers or mid-IR generating fiber lasers is the generation of high energy low noise supercontinuum spectra in soft glass fibers with normal dispersion. The use of normal dispersion fiber allows the use of soft glass fibers with relatively large core diameter for supercontinuum generation which maximizes the spectral density of the generated supercontinuum. Moreover, the implementation of normal dispersion fibers further increases the coherence properties and reduces the noise of the generated supercontinuum allowing for low noise supercontinuum pulse energies >about 10 nJ and up to the microjoule level, for example in the range from about 10 nJ to about 10 µT. Such high spectral density supercontinuum sources are, for example, useful in remote sensing applications.

Figure 5:
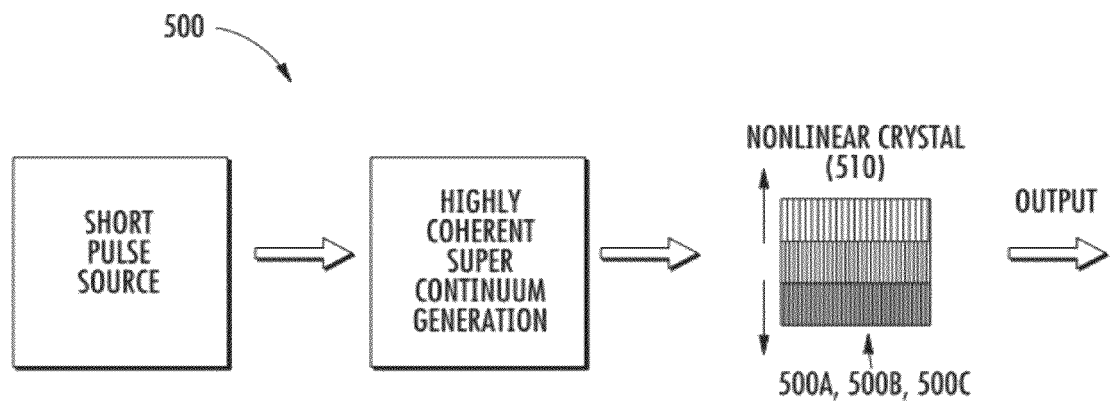
FIG. 5 schematically illustrates an embodiment of a low noise wavelength tunable source implementing a highly coherent supercontinuum spectrum.

The availability of highly nonlinear supercontinuum spectra also allows the construction of alternative embodiments of wavelength tunable sources. An exemplary embodiment of such a wavelength tunable source 500 is shown in FIG. 5. The embodiment comprises a short pulse source, a stage generating a highly coherent, supercontinuum spectrum comprising a highly nonlinear fiber or waveguide, and a nonlinear crystal 510 for wavelength conversion disposed downstream from the stage. In this example, the nonlinear crystal is configured with three sections 500a, 500b, and 500c, to selectively shift the wavelength. For example, the crystal may comprise PPLN with three distinct poling periods. Wavelength selection may be implemented by translating the crystal relative to the beam position, as depicted in FIG. 5. In some alternative embodiments, a tunable optical filter can also be implemented alone or in combination with the nonlinear crystal. The nonlinear crystal can, for example, comprise a periodically poled $LiNbO_3$ crystal, although any other suitable nonlinear crystal can also be used. When using a short pulse Tm fiber based system in conjunction with a silica based highly nonlinear fiber and frequency doubling in the nonlinear crystal, frequency doubling can produce an output tunable from around 500 nm to around 1300 nm. With additional optical filtering, a wavelength tunable source tunable from 500-2600 nm can be constructed. Appropriate control of the injected power into the supercontinuum generating stage as well as a selection of an appropriate poling period in the nonlinear crystal can further maximize the spectral density obtained after frequency doubling or optical filtering. Alternatively, three-wave mixing or difference frequency generation (DFG) between the output of the short pulse source and the output of the highly nonlinear fiber can be used to generate spectral output in the mid-IR to far-IR with selections of appropriate DFG nonlinear crystals. Such an implementation is not separately shown.

Figure 6:
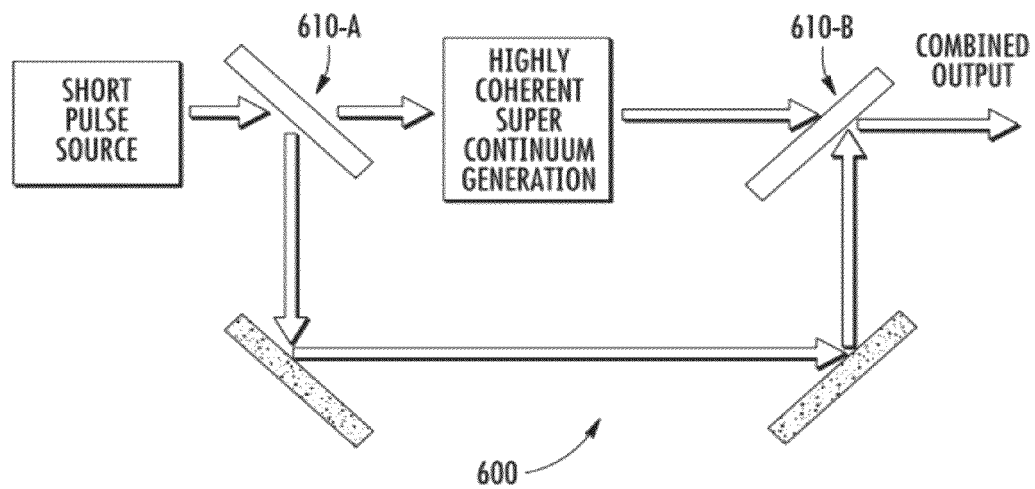
FIG. 6 schematically illustrates an embodiment of a low noise dual wavelength source implementing a highly coherent supercontinuum spectrum.

An exemplary embodiment of a dual wavelength source 600 is shown in FIG. 6. Such sources are useful in several applications, including coherent anti-Stokes Raman spectroscopy, stimulated Raman spectroscopy or spectrally resolved pump probe measurements. The embodiment comprises a short pulse source and a stage producing a highly coherent supercontinuum. One part of the output from the short pulse source is split via a first beam splitter 610-a, whereas the other part is directed to an optical stage for coherent supercontinuum generation, generating a second output. A second beam splitter 610-b then combines the two outputs generating a combined (third) output. Appropriate time delays inserted via additional reflective components can further ensure temporal overlap of the first two outputs in the combined output. Additional optical pulse or spectral shaping elements can further be included between the second output and the second beam splitter 610-b for the generation of spectrally or temporally shaped supercontinuum spectra. Such an implementation is not separately shown.

Figure 7:
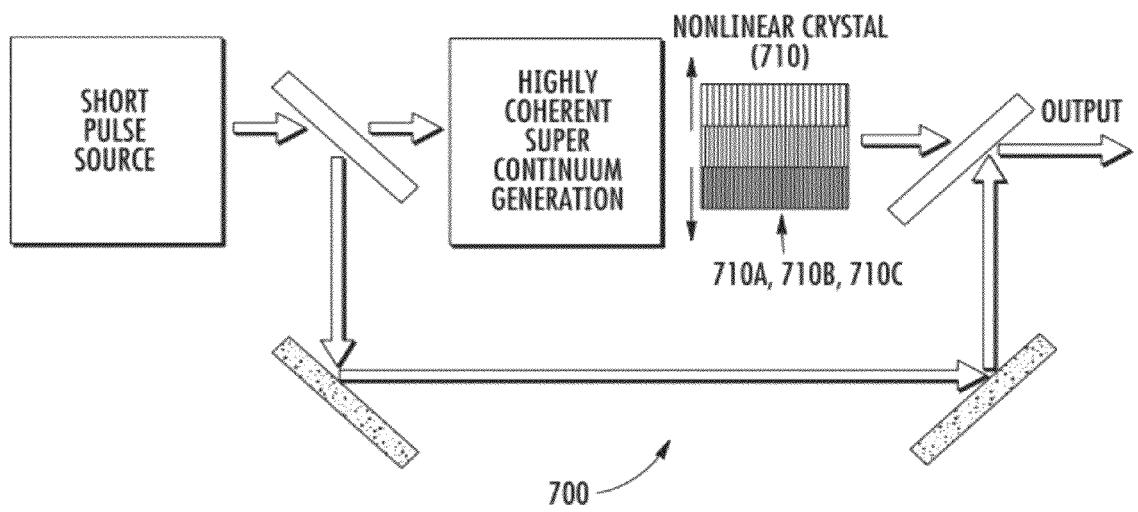
FIG. 7 schematically illustrates an embodiment of a low noise dual wavelength tunable source implementing a highly coherent supercontinuum spectrum.

An exemplary embodiment of a dual wavelength tunable source 700 is shown in FIG. 7. Such sources are useful in several applications, including coherent anti-Stokes Raman spectroscopy, stimulated Raman spectroscopy or spectrally resolved pump probe measurement. The embodiment is constructed in a similar fashion as explained with respect to FIG. 6. A nonlinear crystal for frequency conversion is inserted after the output of the supercontinuum generation stage to produce a wavelength tunable output, as explained with respect to FIG. 5. For example, the nonlinear crystal 710 has selectable portions 710a, 710b, and 710c as shown in FIG. 5.

Low noise, highly coherent supercontinuum sources can be utilized in many applications. They are of great benefit in spectroscopy applications such as Fourier transform spectroscopy or multi-heterodyne spectroscopy as well as linear optical sampling. In fact, any measurement technique that includes some form of coherent detection with supercontinuum pulses provided as a local oscillator input greatly benefit from a low noise characteristic, and especially low phase noise. As an example of such coherent detection, a portion of the continuum spectrum is diverted to act as the local oscillator for the signal under test. The signal under test is then coherently amplified by the local oscillator before being detected by a detector. Heterodyne or multi-heterodyne detection schemes involving two coherent frequency comb lasers were disclosed in Fermann et al., 'Optical Signal Processing with Modelocked Lasers', U.S. patent application No. 61/364,545 and are not further described here. For multi-heterodyne detection across large bandwidths, coherent octave spanning supercontinuum sources as described are very useful. In some embodiments it is sufficient to generate a coherent supercontinuum using only one supercontinuum fiber and one or two short pulse sources. In other embodiments, two coherent supercontinuum spectra generated by two short pulse sources may be implemented. In some embodiments the carrier phase of the source or sources is free running and the repetition rate of the pulse sources is free running or phase or frequency locked using a radio frequency reference signal. In other embodiments the carrier phase and the repetition rate of the sources are phase locked using radio frequency reference signals, optical reference lasers or f-2f interferometers.

Multi-heterodyne detection can be implemented for the determination of a characteristic of a sample. The characteristic can, for example, comprise absorption, reflectivity as well as emission from within a sample. Multi-heterodyne detection involving two short pulse sources then involves generating two supercontinuum spectra, where each supercontinuum is comprised of individual spectral lines separated uniformly in optical frequency space and the optical frequency spacing is different for the two supercontinuum spectra. Multi-heterodyne detection involving two short pulse sources further involves optically combining the two continuum spectra generated by the two pulse sources, exposing the sample to at least one part of the spectral span of the continuum and detecting a response to the exposing step by analysis of the radio-frequency spectrum corresponding to the beating of the two coherent supercontinuum spectra in the selected spectral span. Since multi-heterodyne detection schemes measure essentially optical beat frequencies, mainly phase noise of the supercontinuum source is a limiting factor. Amplitude noise can be suppressed using dual balanced detection schemes as also discussed in U.S. patent application No. 61/364,545.

Figure 8:
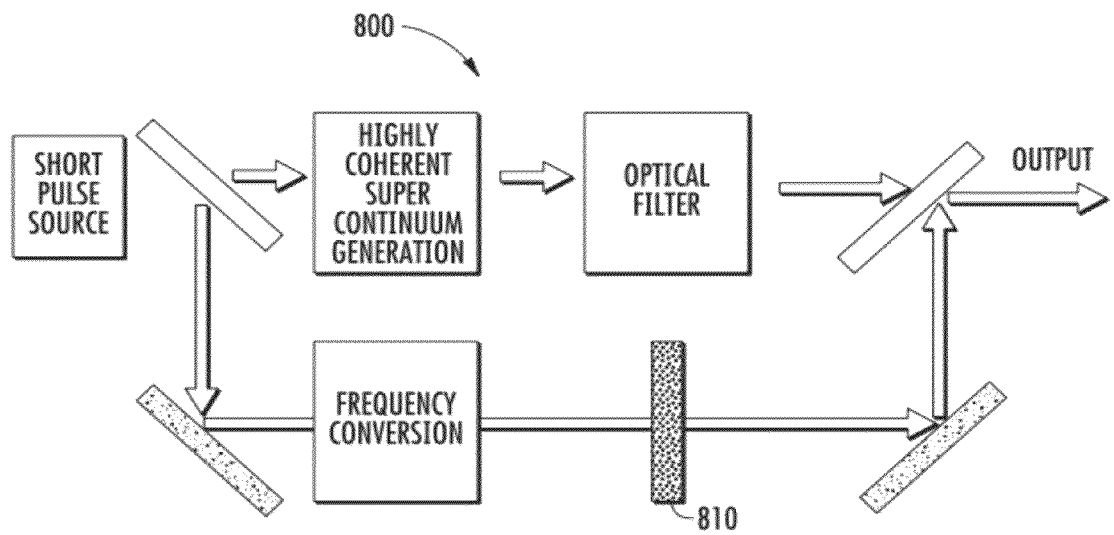
FIG. 8 schematically illustrates a generic embodiment of a coherent detection scheme suitable for spectroscopic analysis of a sample under test with a highly coherent supercontinuum spectrum.

A generic coherent optical detection arrangement 800 using only one laser source and a coherent supercontinuum are shown in FIG. 8. The short pulse source is split into two propagation paths by a first beam splitter. The pulses propagating along a first propagation path are coupled into a supercontinuum stage comprising a highly nonlinear fiber or waveguide to generate a highly coherent continuum. An optical filter downstream of said continuum can filter out spectral regions of interest from the continuum. The pulses propagating along the second propagation path are directed to an optional frequency conversion stage, which may include a nonlinear frequency converting crystal or another stage generating a highly coherent continuum. The pulses coupled out of the frequency conversion stage are then directed into a sample 810 where a coherent nonlinear process is induced. For example, the coherent nonlinear process can comprise coherent anti-Stokes Raman scattering generating a spectral output which overlaps with the spectral components selected by the above optical filter inserted into the first propagation path. After recombining the two propagation paths by a second beam splitter, a detector then measures the coherent signal output from the two propagation paths. To offset the signal from the baseband and to enable heterodyne detection, the phase delay between the two propagation paths can be modulated or a frequency shifter such as an acousto-optic modulator can be incorporated into one of the propagation paths. Such schemes are not separately shown. Also a group delay section can be implemented (not shown) to adjust the group delay between the two optical propagation paths. The spectral output generated by the supercontinuum stage in the first propagation path can thus be used to greatly amplify the weak-signal generated by the coherent process.

Alternatively, the coherent process can also be generated in the first propagation arm and heterodyne detection can be implemented. Such a scheme is not separately shown. Also, spectral or temporal pulse shaping can be inserted in each arm to enhance the coherent process or the heterodyne detection signal. Such an implementation is not separately shown.

Low noise, highly coherent supercontinuum sources are also of great interest in imaging applications as well as micro-spectroscopy. Imaging applications of low noise supercontinuum sources comprise optical coherence tomography, all varieties of confocal fluorescence microscopy and super resolution microscopy, such as for example stimulated emission depletion microscopy (STED). Low noise supercontinuum spectra are particularly useful when detecting signals using lock-in detection schemes. The signal/noise ratio of the detected signals is then directly impacted by the noise of the supercontinuum source, which is preferably shot noise limited at the detection frequency of the lock-in amplifier. Though lock-in detection schemes are also useful when used with non-shot-noise limited sources.

Figure 9:
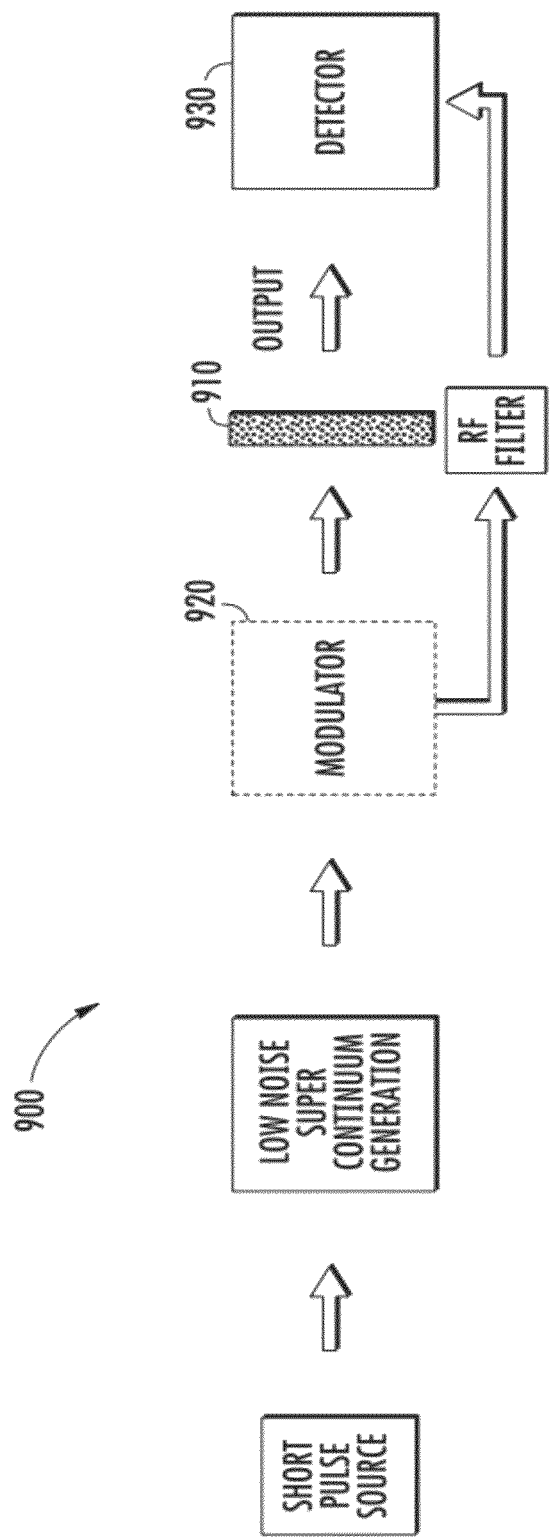
FIG. 9 schematically illustrates a generic embodiment of a lock-in detection scheme suitable for spectroscopic analysis of a sample under test with a low-noise supercontinuum spectrum.

A generic lock-in detection arrangement 900 involving a low noise supercontinuum source is shown in FIG. 9. The low noise supercontinuum source can be highly coherent, but it alternatively it can also be incoherent and close to shot noise limited at least at the lock-in detection frequency. The short pulse source is coupled into an optical element to generate a low noise supercontinuum. The pulse source has preferably a pulse width <100 ps. A sample 910 is inserted into the output from the supercontinuum source, and the supercontinuum output induces a modification of the phase or the amplitude of the supercontinuum. The modification can be spectrally dependent. Optical filters or gratings (not shown) can also be included and used to spectrally select or disperse the output from the sample. The spectral output from the sample or the spectrally dispersed output from the sample is then detected by a detector 930 or a detector array respectively. Additional optical elements enabling spectrally resolved detection can also be used. For example, a scanning Michelson interferometer can be included to enable Fourier transform spectroscopy. Such modifications are not separately shown. The sample may be probed either in transmission or reflection.

The detection signal is further electronically filtered at either the repetition rate of the pulse source or at an appropriately selected modulation frequency for lock-in detection. For example, a modulator 920 can be inserted upstream of the detector for signal modulation. In various embodiments the modulator can be inserted upstream or downstream from the supercontinuum source or between sample and detector. FIG. 9 shows an implementation with the modulator inserted between supercontinuum source and sample. However other methods for generating a signal modulated at an appropriate detection frequency can also be implemented. These methods can also comprise a modulation of the carrier envelope offset frequency of the short pulse source. The modulation frequency of the modulator is further transmitted to the detector to enable phase sensitive detection at the modulation frequency. When using the repetition rate of the pulse source as the local oscillator, the repetition rate of the pulse is detected with a second detector (not shown) and subsequently transmitted to the first detector. Additional optical scanning elements for the detection of spatially resolved information can also be included and are not shown here.

Other imaging applications comprise all varieties of multi-photon microscopy, such as multi-photon microscopy based on two photon and three photon fluorescence, surface second harmonic generation, third harmonic generation, coherent anti-Stokes Raman scattering as well as stimulated Raman scattering. Micro-spectroscopy applications can comprise for example mid-IR absorption spectroscopy as well as tip enhanced spectroscopy.

Thus, the invention has been described in several embodiments. It is to be understood that the embodiments are not mutually exclusive, and elements described in connection with one embodiment may be combined with, or eliminated from, other embodiments in suitable ways to accomplish desired design objectives.

At least one embodiment includes a coherent supercontinuum source. The coherent supercontinuum source includes a low-noise fiber-based pulsed source arranged in combination with a highly non-linear material. The low-noise fiber-based source includes a mode locked fiber oscillator. The fiber-based pulse source generates an output that includes short optical pulses having a pulse width <1 ps and a central wavelength >1700 nm. The highly non-linear material receives an output from the low-noise fiber-based pulse source and generates a coherent supercontinuum having a spectral bandwidth of at least one-half octave measurable at two −30 dB points. The coherent supercontinuum source includes a low-noise pump source to pump the low-noise fiber-based pulsed source. A first order, nearest neighbor coherence value of at least 0.7 at two locations within the spectral bandwidth is obtainable with the coherent supercontinuum source.

In any or all embodiments a highly nonlinear material may include a highly nonlinear silica fiber having a core region with a Germania concentration >10 mole %.

In any or all embodiments a supercontinuum may cover a spectral bandwidth larger than 1 octave measured between two −30 dB points.

In any or all embodiments a highly nonlinear silica fiber may be dispersion flattened with a dispersion value <10 ps$^2$/ km in a spectral range within ±100 nm of the central wavelength of the fiber-based pulsed source.

In any or all embodiments a highly nonlinear fiber may have a W-refractive index profile.

In any or all embodiments a highly nonlinear material may include photonic crystal fiber.

In any or all embodiments a photonic crystal fiber may be silica based and have a core region with a Germania concentration >10 mole %.

In any or all embodiments a low-noise pump source may include at least one single-frequency seed source.

In any or all embodiments a low-noise pump source may include a seed source nearly free of any longitudinal mode structure.

In any or all embodiments a low-noise pump source may include a seed source that generates amplified spontaneous emission.

In any or all embodiments an output of a low-noise pump source may be injected into the core of a gain fiber within a mode locked fiber oscillator of a coherent supercontinuum source.

In any or all embodiments a low-noise fiber-based source may include a passively mode locked fiber oscillator based on a Tm, Tm:Ho, or a Ho doped fiber.

In any or all embodiments a highly nonlinear material may include a soft or heavy metal oxide glass fiber.

In any or all embodiments a highly nonlinear material may be selected from SF-6, bismuth, lead, tellurite, fluoride, fluorotellurite or chalcogenide glass fiber In any or all embodiments a highly nonlinear fiber may be a non-silica fiber, and may be dispersion flattened with a dispersion value <100 ps$^2$/km in a spectral range within ±100 nm of the central wavelength of the laser source.

In any or all embodiments a low-noise fiber based source may produce pulses with a pulse width <300 fs.

In any or all embodiments a low-noise fiber-based source may produce pulses with a pulse width <100 fs.

In any or all embodiments a highly nonlinear material may include a periodically poled nonlinear crystal waveguide.

In any or all embodiments a supercontinuum source may exhibit high phase coherence at least at two spectral points within the continuum, the two spectral points separated by at least one-half octave.

In any or all embodiments a highly nonlinear material may include a high numerical aperture photonic crystal fiber (PCF) having a core and a single layer of air holes at least partially surrounding the core.

In any or all embodiments coherence may be measurable by an RF beat signal with a S/N ratio of at least 10 dB when measured with an RF frequency analyzer at 100 kHz resolution, and measurable with an f-2f interferometer.

In any or all embodiments a spectrum of a supercontinuum may include multiple spectral lines, and the coherence may be characterized with a detectable RF beat signal between a single frequency laser output and an individual frequency line separated within the supercontinuum spectrum by at least 0.5 octave from the central wavelength, the RF beat having a S/N ratio of at least about 10 dB measurable with an RF frequency analyzer at about 100 kHz resolution.

In any or all embodiments a highly nonlinear material may include a highly nonlinear fiber.

In any or all embodiments a highly nonlinear material may have a normal dispersion value at the central wavelength of the fiber-based pulsed source.

In any or all embodiments a highly nonlinear material may include a soft or heavy metal oxide glass fiber, and the fiber may have a normal dispersion value at the central wavelength of the fiber-based pulsed source.

In any or all embodiments a low-nose fiber source may exhibit root mean square intensity noise (RIN noise) of less than about 1% in a frequency range from about 1 Hz to about 1 MHz At least one embodiment includes a coherent supercontinuum source. The supercontinuum source includes a fiber-based laser source generating short optical pulses. The fiber-based source generates an output at a central wavelength >1700 nm. The short optical pulses include a pulse width <10 ps. The coherent supercontinuum source includes a nonlinear waveguide for self-frequency shifting the output of the fiber-based laser source to frequency shifted output wavelengths >2200 nm. A highly nonlinear material receives pulses having the frequency shifted output wavelengths and generates the coherent supercontinuum therewith.

At least one embodiment includes a method for coherent detection. The method includes providing a short pulse source with a central emission wavelength >1700 nm. A coherent supercontinuum is generated in a waveguiding material. The method includes inducing coherent signal emission by irradiating a sample with an output of the short pulse source, the signal emission covering a signal emission spectral region. The method further includes selecting a spectral region within the coherent supercontinuum that corresponds with the signal emission spectral region. The method includes interfering two spectrally overlapping signals from the signal emission spectral region and from the corresponding region of the supercontinuum, and amplifying the detected signal.

At least one embodiment includes a method for lock-in detection. The method includes providing a short pulse source with a central emission wavelength >1700 nm, and generating a supercontinuum in a waveguiding material. The method includes modifying the spectrum of the supercontinuum by inserting a sample into the beam path of the supercontinuum. The sample is irradiated with a portion of the supercontinuum at a modulation frequency, and modification of the spectrum is detected at the modulation frequency.

At least one embodiment includes a method for determining a characteristic of a sample. The method includes providing a short pulse source with a central emission wavelength >1700 nm. A low noise supercontinuum is generated in a waveguiding material. The method includes irradiating a sample with at least part of the supercontinuum, and detecting a response to the irradiating step produced by the sample. A characteristic of the sample is determined based upon the response.

In any or all embodiments a supercontinuum may be coherent and may include a plurality of monochromatic spectral lines.

In any or all embodiments at least one of the monochromatic spectral lines may be locked to an external frequency reference signal.

In any or all embodiments a carrier envelope offset frequency of the spectral lines may be locked to an external reference signal.

At least one embodiment includes a method for determining a characteristic of a sample using multi-heterodyne detection. The method includes providing at least one short pulse source with a central emission wavelength >1700 nm. The method further includes generating two coherent supercontinuum spectra, wherein the two supercontinuum spectra include individual frequency lines with a certain frequency spacing, the frequency spacing being different for both supercontinuum spectra. A sample is irradiated with at least a portion of the two supercontinuum spectra. The method includes detecting a response to the irradiating step as produced by the sample and determining a characteristic of the sample based upon the response.

At least one embodiment includes a method for spectral detection. The method includes providing a short pulse source with a central emission wavelength >1700 nn and generating a supercontinuum in a waveguiding material. The spectrum of the supercontinuum is modified by inserting a sample into the beam path of the supercontinuum, and irradiating the sample with a portion of the supercontinuum. Modification of the spectrum is detected.

Thus, while only certain embodiments have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the embodiments described therein.

Certain aspects, advantages and novel features of the present invention are described herein. However, it is to be understood that not necessarily all such advantages may be achieved in accordance with any particular embodiment. Thus, the present invention may be embodied or carried out in a manner that achieves one or more advantages without necessarily achieving other advantages as may be taught or suggested herein.

What is claimed is:

1. A coherent supercontinuum source, comprising:
   a low-noise fiber-based pulsed source arranged in combination with a highly non-linear material, said low-noise fiber-based source comprising a mode locked fiber oscillator, said fiber-based pulse source generating an output comprising short optical pulses having a pulse width <1 ps at a central wavelength >1700 nm, said highly nonlinear material receiving said output from said low-noise fiber-based pulse source and generating a coherent supercontinuum having a spectral bandwidth of at least one-half octave between two −30 dB points; and
   a low-noise pump source to pump said low-noise fiber-based pulsed source,
   wherein said supercontinuum is characterized by having a first order nearest neighbor coherence value of at least 0.7 at two locations within said spectral bandwidth.

2. The coherent supercontinuum source according to claim 1, wherein said continuum covers a spectral bandwidth larger than 1 octave measured between two −30 dB points.

3. The coherent supercontinuum source according to claim 1, wherein said highly nonlinear material comprises a highly nonlinear silica fiber comprising a core region with a Germania concentration >10 mole %.

4. The coherent supercontinuum source according to claim 3, wherein said highly nonlinear silica fiber is dispersion flattened with a dispersion value <|10| $ps^2$/km in a spectral range within ±100 nm of the central wavelength of said fiber-based pulsed source.

5. The coherent supercontinuum source according to claim 3, wherein said highly nonlinear fiber has a W refractive index profile.

6. The coherent supercontinuum source according to claim 1, wherein said highly nonlinear material comprises a photonic crystal fiber.

7. The coherent supercontinuum source according to claim 6, wherein said photonic crystal fiber is silica based and comprises a core region with a Germania concentration >10 mole %.

8. The coherent supercontinuum source according to claim 1, wherein said low-noise pump source comprises at least one single-frequency seed source.

9. The coherent supercontinuum source according to claim 1, wherein said low-noise pump source comprises a seed source nearly free of any longitudinal mode structure.

10. The coherent supercontinuum source according to claim 1, wherein said low-noise pump source comprises a seed source that generates amplified spontaneous emission.

11. The coherent supercontinuum source according to claim 1, wherein an output of said pump source is injected into the core of a gain fiber within said mode locked fiber oscillator.

12. The coherent supercontinuum source according to claim 1, wherein said low-noise fiber-based source comprises a passively mode locked fiber oscillator based on a Tm, Tm:Ho, or a Ho doped fiber.

13. The coherent supercontinuum source according to claim 1, wherein said highly nonlinear material is selected from SF-6, bismuth, lead, tellurite, fluoride, fluorotellurite or chalcogenide glass fiber.

14. The coherent supercontinuum source according to claim 1, wherein said highly nonlinear material comprises a soft or heavy metal oxide glass fiber.

15. The coherent supercontinuum source according to claim 14, wherein said highly nonlinear fiber is non-silica fiber, and is dispersion flattened with a dispersion value <|100| $ps^2$/km in a spectral range within ±100 nm of the central wavelength of said laser source.

16. The coherent supercontinuum source according to claim 1, wherein said low-noise fiber based source produces pulses with a pulse width <300 fs.

17. The coherent supercontinuum source according to claim 1, wherein said low-noise fiber-based source produces pulses with a pulse width <100 fs.

18. The coherent supercontinuum source according to claim 1, wherein said highly nonlinear material comprises a periodically poled nonlinear crystal waveguide.

19. The coherent supercontinuum source according to claim 1, said supercontinuum source exhibits high phase coherence at least at two spectral points within said continuum, said two spectral points separated by at least one-half octave.

20. The coherent supercontinuum source according to claim 1, wherein said highly nonlinear material comprises a high numerical aperture photonic crystal fiber (PCF) having a core and a single layer of air holes at least partially surrounding said core.

21. The coherent supercontinuum source according to claim 1, wherein said coherence is measurable by RF beat signal with a S/N ratio of at least 10 dB when measured with an RF frequency analyzer at 100 kHz resolution, measurable with an f-2f interferometer.

22. The supercontinuum source according to claim 1, wherein a spectrum of said supercontinuum comprises multiple spectral lines, and said coherence is characterizable with a detectable RF beat signal between a single frequency laser output and an individual frequency line separated within said supercontinuum spectrum by at least 0.5 octave from said central wavelength, said RF beat signal having a S/N ratio of at least about 10 dB measurable with an RF frequency analyzer at about 100 kHz resolution.

23. The coherent supercontinuum source according to claim 1, wherein said highly nonlinear material comprises a highly nonlinear fiber.

24. The coherent supercontinuum source according to claim 23, wherein said highly nonlinear material has a normal dispersion value at the central wavelength of said fiber-based pulsed source.

25. The coherent supercontinuum source according to claim 1, wherein said highly nonlinear material comprises a soft or heavy metal oxide glass fiber, and said fiber has a normal dispersion value at the central wavelength of said fiber-based pulsed source.

26. A coherent supercontinuum source comprising;
- a fiber-based laser source generating short optical pulses, said fiber-based source generating an output at a central wavelength >1700 nm, said short optical pulses comprising a pulse width <10 ps;
- a nonlinear waveguide for self-frequency shifting the output of said fiber-based source to frequency shifted output wavelengths >2200 nm; and
- a highly nonlinear material receiving pulses having said frequency shifted output wavelengths and generating said coherent supercontinuum therewith,
- wherein said coherent supercontinuum generated with said highly nonlinear material is characterized by having a spectral bandwidth of at least one-half octave between two −30 dB points and a first order nearest neighbor coherence value of at least 0.7 at two locations within said spectral bandwidth.

* * * * *